(12) United States Patent
Dika

(10) Patent No.: US 10,861,070 B2
(45) Date of Patent: Dec. 8, 2020

(54) SYSTEM AND METHOD FOR PROCESSING AND IMPLEMENTING PRODUCT REGULATIONS

(71) Applicant: Meijer, Inc., Grand Rapids, MI (US)

(72) Inventor: Jason Dika, Grand Rapids, MI (US)

(73) Assignee: Meijer, Inc., Grand Rapids, MI (US)

( * ) Notice: Subject to any disclaimer, the term of this patent is extended or adjusted under 35 U.S.C. 154(b) by 233 days.

(21) Appl. No.: 15/702,036

(22) Filed: Sep. 12, 2017

(65) Prior Publication Data

US 2018/0075502 A1 Mar. 15, 2018

Related U.S. Application Data

(60) Provisional application No. 62/394,406, filed on Sep. 14, 2016.

(51) Int. Cl.
| | |
|---|---|
| *G06Q 30/06* | (2012.01) |
| *G06Q 20/20* | (2012.01) |
| *G09F 3/00* | (2006.01) |
| *G06F 16/93* | (2019.01) |
| *G06Q 20/00* | (2012.01) |
| *G06F 16/903* | (2019.01) |

(52) U.S. Cl.
CPC ... *G06Q 30/0607* (2013.01); *G06F 16/90335* (2019.01); *G06Q 20/00* (2013.01); *G06Q 20/202* (2013.01); *G06Q 30/0623* (2013.01); *G09F 3/00* (2013.01)

(58) Field of Classification Search
CPC .. G06Q 30/0607; G06Q 20/00; G06Q 20/202; G06Q 30/0623; G06F 16/90335; G09F 3/00

USPC ........................................................ 705/21
See application file for complete search history.

(56) References Cited

U.S. PATENT DOCUMENTS

| | | | |
|---|---|---|---|
| 10,222,361 B2* | 3/2019 | Jackson, Jr. ........... | G01N 33/15 |
| 2007/0106617 A1* | 5/2007 | Mabray ................. | G06Q 30/06 |
| | | | 705/59 |
| 2008/0040390 A1* | 2/2008 | Oves ...................... | G16C 20/90 |
| 2014/0279221 A1* | 9/2014 | Woodward ......... | G06Q 30/0607 |
| | | | 705/26.25 |
| 2015/0156342 A1* | 6/2015 | Fries ................... | H04N 1/00411 |
| | | | 358/1.15 |
| 2016/0155127 A1* | 6/2016 | Hartman .............. | G06Q 20/206 |
| | | | 705/18 |

(Continued)

*Primary Examiner* — Florian M Zeender
*Assistant Examiner* — Nicole Elena Bruner
(74) *Attorney, Agent, or Firm* — Barnes & Thornburg LLP; Jeffrey Michael

(57) ABSTRACT

In a system and method for processing and implementing product regulations at a retail enterprise, a list is received by a retail server of products offered for sale by the enterprise that are regulation eligible, the received list of products is compared with product data identifying products offered for sale to all customers of the enterprise, each product in a database of the enterprise that matches a product in the list and that is not already marked therein as regulation eligible is marked as regulation eligible, and for each product so marked at least one characteristic of the product upon which regulation eligibility is based is determined, the database is searched to identify similar products that include the at least one characteristic, and for each identified similar product a request is transmitted for a determination of regulation eligibility thereof.

6 Claims, 10 Drawing Sheets

(56) References Cited

U.S. PATENT DOCUMENTS

2018/0322511 A1* 11/2018 Sheth ................ G06K 9/00442

* cited by examiner

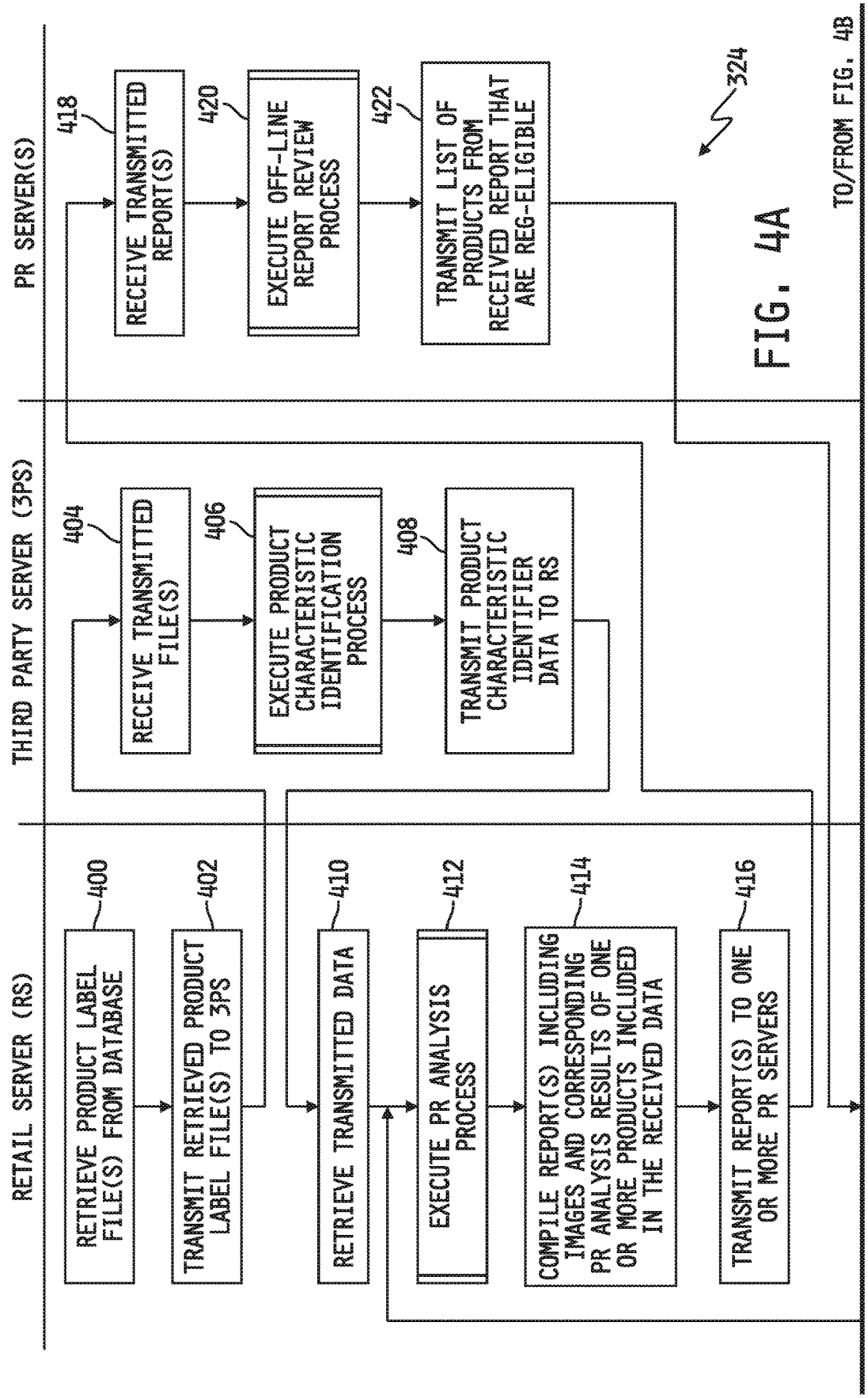

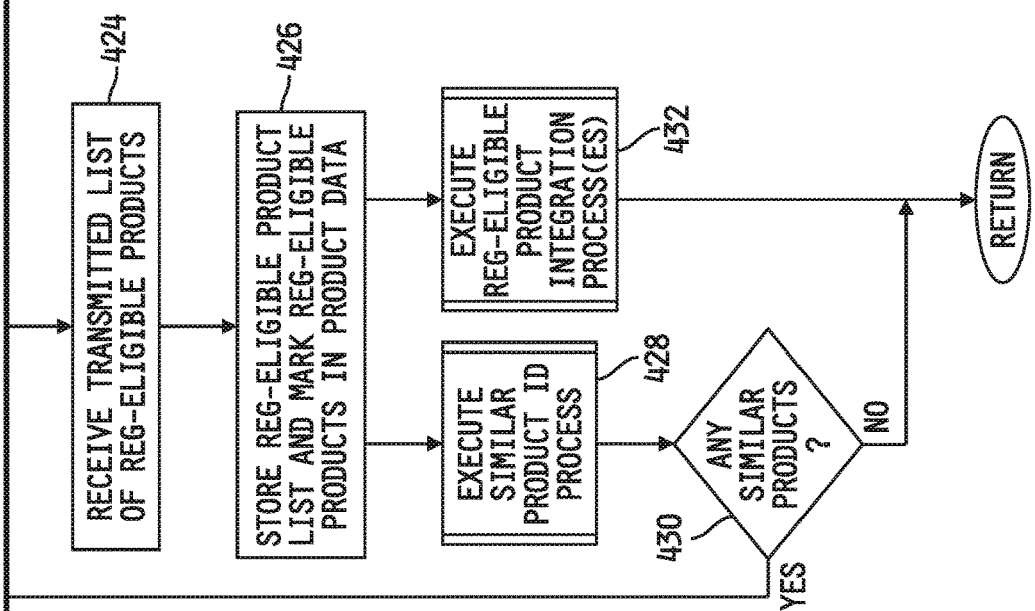

SYSTEM AND METHOD FOR PROCESSING AND IMPLEMENTING PRODUCT REGULATIONS

CROSS-REFERENCE TO RELATED U.S. APPLICATION

This application claims the benefit of, and priority to, U.S. Patent Application No. 62/394,406, filed Sep. 14, 2016, the disclosure of which is incorporated herein by reference in its entirety.

FIELD OF THE INVENTION

The present invention relates generally to systems and methods for processing and implementing product regulation information.

BACKGROUND

Some retail products may be regulated such that their purchase may be restricted and/or subsidized by one or more governmental and/or non-governmental entities. As one example, some food products are at least partially subsidized for a subset of customers that are eligible for such subsidies according to a corresponding subsidy program administered by a state, local and/or federal government agency. It may be desirable to automate one or more processes by which products subject to such product regulations can be analyzed to easily determine whether they are or should be eligible for restricted purchase and/or subsidies under one or more such programs.

SUMMARY

The present invention may comprise one or more of the features recited in the attached claims, and/or one or more of the following features and combinations thereof. In a first example aspect, a method for processing and implementing product regulations at a retail enterprise may comprise receiving via communication circuitry of a retail server of the retail enterprise from a product regulation server of a product regulation authority a first signal carrying a list of products offered for sale by the retail enterprise that are regulation eligible, wherein a regulation eligible product is defined as a product authorized by the product regulation authority to be eligible for restricted sale to a subset of customers of the retail enterprise under a product regulation program, comparing by a processor of the retail server the received list of products with product data stored in a database coupled to the processor, the product data identifying products offered for sale to all customers of the retail enterprise, with the processor, marking in the database as regulation eligible each product in the product data that matches a product in the received list of products and that is not already marked as regulation eligible in the database, and for at least one product marked in the database as regulation eligible, determining with the processor one or more characteristics of the product upon which determination by the product regulation authority of the regulation eligibility thereof is based, searching, with the processor, the database to identify similar products stored therein which have the one or more characteristics, for each identified similar product, generating with the processor a report including the identified similar product and the one or more characteristics thereof, and controlling the communication circuitry with the processor to transmit to the product regulation server a second signal carrying a list of the identified similar products and associated reports and also carrying a request for a determination of regulation eligibility of the identified similar products based on their associated reports.

In a second example aspect, a method for processing and implementing product regulations at a retail enterprise may comprise storing in a memory, with a processor of a retail server of the retail enterprise, product characteristic identifiers for a product offered for sale by the retail enterprise, the product characteristic identifiers identifying at least one of a content of the product and a claim associated with the product, storing in the memory, with the processor, product regulation criteria for the product, the product regulation criteria for the product including one or more rules that must be satisfied by the product to be deemed by a product regulation authority as a regulation eligible product, wherein a regulation eligible product is defined as a product authorized by the product regulation authority to be eligible for restricted sale to a subset of customers of the retail enterprise under a product regulation program managed by the product regulation authority, mapping, with the processor, the product characteristic identifiers for the product to corresponding ones of the one or more rules of the product regulation criteria for the product, comparing, with the processor, the mapped product characteristic identifiers and the corresponding ones of the one or more rules to determine whether the product should be a regulation eligible product, and if the processor determines that the product should be a regulation eligible product, generating with the processor a product report including the product characteristic identifiers, the corresponding ones of the one or more rules and results of the mapping and comparison thereof, and controlling, with the processor, communication circuitry of the retail server to transmit to the product regulation authority a first signal carrying an identification of the product and the product report and also carrying a request for a determination by the product regulation authority of regulation eligibility of the product based on the product report.

In a third example aspect, a method for processing and implementing product regulations at a retail enterprise may comprise storing in a memory, with a processor of a retail server of the retail enterprise, product characteristic identifiers for a product offered for sale by the retail enterprise and an overall product content for a similar product offered for sale by the retail enterprise, the product characteristic identifiers for the product identifying at least one of a content of the product and a claim associated with the product, storing in the memory, with the processor, product regulation criteria for the product, the product regulation criteria for the product including one or more rules that must be satisfied by the product to be deemed by a product regulation authority as a regulation eligible product, wherein a regulation eligible product is defined as a product authorized by the product regulation authority to be eligible for restricted sale to a subset of customers of the retail enterprise under a product regulation program managed by the product regulation authority, mapping, with the processor, the product characteristic identifiers for the product to corresponding ones of the one or more rules of the product regulation criteria for the product, comparing, with the processor, the mapped product characteristic identifiers and the corresponding ones of the one or more rules to determine whether the product should be a regulation eligible product, and if the processor determines that at least one of the product characteristic identifiers of the product violates at least one of the corresponding ones of the one or more rules: determining, with the processor, the overall content of the product based on the product characteristic identifiers for the product, comparing, with the processor, the determined overall content of the product with the overall product content of the similar product, and if the determined overall content of the product is superior to the overall product content of the similar product, generating, with the processor, a report including the product characteristic identifiers for the product, the corresponding ones of the one or more rules, the results of the mapping and comparison thereof and results of comparison of the overall content of the product with the overall product content of the similar product, and controlling the communication circuitry of the retail server with the processor to transmit to the product regulation authority a second signal carrying an identification of the product and the report and also carrying a request for a determination by the product regulation authority of regulation eligibility of the product based on the report.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

FIGS. 4A and 4B are simplified flow diagrams of an embodiment of a product regulation process for processing retail products relative to one or more sets of retail product regulations.

DETAILED DESCRIPTION OF THE DRAWINGS

Figure 1:
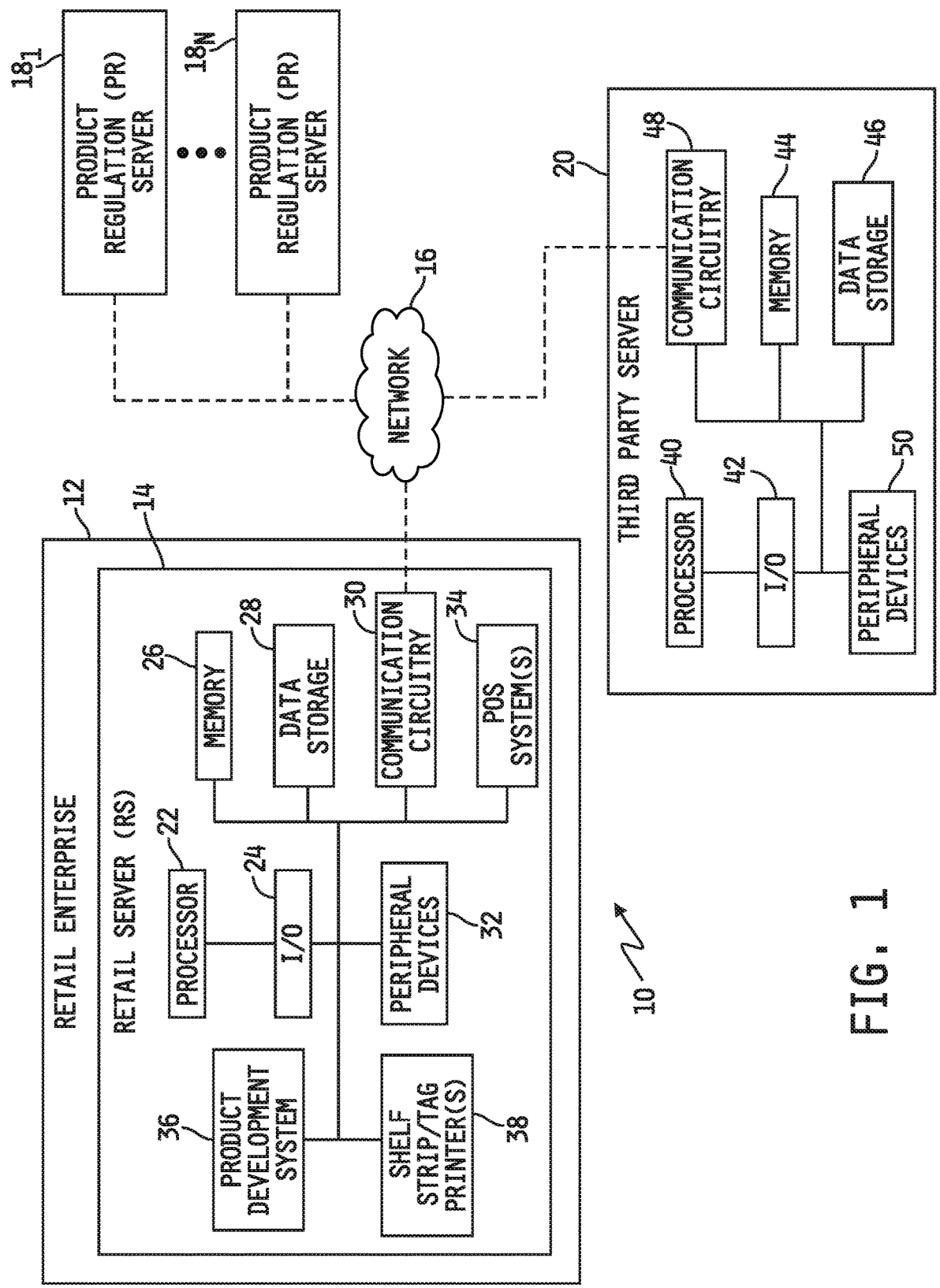
FIG. 1 is a simplified block diagram of an embodiment of a system for processing and implementing product regulations.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure, process, process step or characteristic is described in connection with an embodiment, it is submitted that it is within the knowledge of one skilled in the art to effect such feature, structure, process, process step or characteristic in connection with other embodiments whether or not explicitly described. Further still, it is contemplated that any single feature, structure, process, process step or characteristic disclosed herein may be combined with any one or more other disclosed feature, structure, process, process step or characteristic, whether or not explicitly described, and that no limitations on the types and/or number of such combinations should therefore be inferred.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on one or more non-transient, machine-readable media, which may be read and executed by one or more processors. A non-transient, machine-readable medium may be embodied as any device or physical structure for storing or transmitting information in a form readable by a machine (e.g., a computing device). For example, a non-transient, machine-readable medium may be embodied as any one or combination of read only memory (ROM); random access memory (RAM); magnetic disk storage media; optical storage media; flash memory devices; and others.

Referring now to FIG. 1, a system 10 is shown for processing and implementing product regulations. The system 10 illustratively includes a retail enterprise 12 including at least one retail server 14 operable to control and manage, at least in part, some or all of the operations of the retail enterprise 12. The retail server 14 may illustratively be communicatively coupled to one or more product regulation (PR) servers $18_1$-$18_N$, where N may be any positive integer, and/or to one or more third-party servers or systems, e.g., the third-party server 20 illustrated in FIG. 1, via a communication network 16. The retail enterprise 12 may include one or more brick-and-mortar stores in one or more jurisdictions (i.e., states), and in the illustrated embodiment the retail server 14 is operable to control and manage operations for all such brick-and-mortar stores. In alternate embodiments, the retail enterprise 12 may include multiple retail servers 14, e.g., one or more in each jurisdiction and/or one or more associated with each brick-and-mortar store. In some embodiments, the system may further include one or more so-called hub servers positioned between the retail server 14 and one or more of the brick-and-mortar stores and/or between the retail server 14 and one or more subsets or groups of brick-and-mortar stores, and in any such embodiment the retail server 14 may act as a conventional master server and all such hub servers may act as conventional slave servers. In any of these embodiments, one or more such retail servers 14 may illustratively host a retail website via which customers may purchase retail products for pickup or delivery to customer homes and/or businesses.

In some embodiments, each of the product regulation servers $18_1$-$18_N$ represent one or more servers associated with, and controlled by, a governmental agency in one or more jurisdictions. It will be understood, however, that this represents only one non-limiting example, and that the scope of this disclosure is intended to cover embodiments in which at least one or more of the product regulation servers $18_1$-$18_N$ represent(s) one or more servers associated with, and controlled by, one or more non-governmental agencies. In one example embodiment of the former case, the product regulation servers $18_1$-$18_N$ illustratively include at least one product regulation server associated with, and under the control of, a government agency in each state, or at least in each state in which at least one brick-and-mortar store of the retail enterprise 12 is located. In this example embodiment, the product regulation servers $18_1$-$18_N$ further illustratively include at least one product regulation servers associated with, and under the control of, a corresponding federal government agency. Thus, for example, if the retail enterprise 12 has brick-and-mortar stores in 10 different states, N=11 and the product regulation servers $18_1$-$18_{11}$ are made up of one or more product regulations servers associated with, and under the control of a government agency in, each of the 10 states as well as one or more product regulation servers associated with, and under the control of, a corresponding federal government agency.

As used herein, the terms "regulation-eligible, "eligible for purchase" and the like illustratively refer to retail products which are restricted in some manner to purchase by only a subset of the customers of the retail enterprise 12 and/or to retail products which may be purchased from the retail enterprise 12 by any customer thereof but which are at least partially subsidized for a subset of such customers that are eligible for such subsidies according to a corresponding subsidy program administered by a state, local and/or federal government agency. In other embodiments, such terms may alternatively or additionally refer to retail products which are at least partially subsidized for a subset of customers of the retail enterprise 12 that are eligible for such subsidies according to a corresponding subsidy program administered by one or more non-governmental agencies or entities. In still other embodiments, such terms may alternatively or additionally refer to retail products that are, in some manner, restricted in their purchase by one or more subsets of customers of the retail enterprise 12 according to one or more governmental or non-governmental product regulation programs. It will be understood that any such meaning of the terms "regulation-eligible, "eligible for purchase" and the like are intended to fall within the scope of this disclosure.

In one specific implementation of the system 10 illustrated in FIG. 1, which should not be considered limiting in any way, the product regulation servers $18_1$-$18_N$ illustratively include a federal agency-based server under the direction and control of the Special Supplemental Nutrition Program for Women, Infants and Children ("WIC"), the governing regulations of which are found at 7 CFR Part 246 (hereinafter "Federal WIC"), and corresponding state agency-based servers under the direction and control of a WIC agency in each state (hereinafter "State WIC" and collectively "State WICs"). According to the WIC framework, the Federal WIC establishes food content-based rules (hereinafter "Federal WIC Criteria"), and foods that meet or exceed the Federal WIC-established content requirements are eligible for subsidies granted by the federal (United States) government to persons eligible for such subsidies according to an established WIC benefit application and approval process. The federal grants for such subsidies are made available to qualified persons through corresponding State WIC programs, and in this regard the WIC framework allows each State WIC agency to promulgate their own food content-based rules (hereinafter "State WIC Criteria") based on the Federal WIC Criteria. Generally, the Federal WIC Criteria establishes minimum food content-based requirements, and State WIC Criteria promulgated by any state must meet, but may be more restrictive than, the Federal WIC Criteria.

It is within the WIC framework that some problems associated with such product regulation programs will be described, which problems are overcome by the system and methods described herein. However, it will be understood that such problems associated with the WIC program are provided only by way of example, and that other product regulation programs, whether implemented by a governmental or non-governmental agency, may suffer from one or more such problems or similar problems, one or more of which are overcome by the system and methods described herein. The improvements described herein relate to computer-related technologies of information technology and communication technology generally, and more specifically to restricted product purchase implementation technology and product subsidy implementation technology. The improvements described herein further relate to virtual, i.e., "digital," coupon technology, website management technology and product labeling technology.

In conventional implementations of the WIC program by State WIC agencies, each State WIC agency makes the Federally granted WIC subsidies ("WIC Subsidies") available to qualified and pre-approved persons to obtain retail food products that satisfy that State's WIC Criteria. In order for a food product to qualify for such a WIC Subsidy in any particular state, the corresponding State WIC agency must first certify or authorize the food product as WIC-eligible by ensuring that the food product satisfies the State's WIC Criteria. This is typically a manual process via which a manufacturer of the food product provides food product information, i.e., information about the food product, to the State WIC agency, and an employee of the State WIC agency then compares the food product information to a corresponding set of WIC-eligibility rules. If the food product information satisfies all of the rules in the corresponding set of WIC-eligibility rules for that food product, the State WIC agency certifies or authorizes that food product as WIC-eligible in that state. Retailers of the food product in that state may then include a "WIC" identifier on a shelf strip or label for that product to identify the product as WIC-eligible. Such retailers also typically include WIC information in their food product databases so that WIC-eligible products may be automatically identified as such at a point-of-sale system.

One drawback associated with the above-described conventional food product WIC-eligibility process is that it is a manual process conducted by State WIC agencies and is therefore slow and cumbersome by its nature. Another drawback is that the WIC-eligibility process requires the food product information to satisfy all of the rules in an applicable set of WIC-eligibility rules. If only single rule is violated, the food product will not be deemed WIC-eligible even though it may be nutritionally equivalent or superior to similar WIC-eligible food products. Yet another drawback is that the conventional process typically does not provide the food manufacturers with sufficient information to determine the deficiencies of their food products in relation to the WIC-eligibility rules which they may violate.

These and other drawbacks are addressed and overcome by the system and methods described herein. For example, as will be described in greater detail herein, the retail server 14 is illustratively operable to process retail product information, i.e., information relating to existing products and/or new products offered for sale, and/or products to be offered for sale in the future, by the retail enterprise 12, relative to current regulation-eligible retail product information, i.e., relative to one or more lists of retail products that have previously been deemed eligible for purchase according to one or more sets of jurisdiction-based product regulations, e.g., governmental or otherwise, to determine whether such products are currently eligible for purchase according to such product regulations in one or more jurisdictions. For any such retail product not found on the current list of regulation-eligible retail products in one or more jurisdictions of interest, the retail server 14 is, in some embodiments, further operable to map and compare product information for the corresponding retail product to corresponding jurisdiction-based product regulation rules to determine whether the retail product is regulation-eligible according to the product regulation rules for that product in each of the one or more jurisdictions of interest. If so, the retail server 14 is operable to compile the analysis results, produce a corresponding report and transmit the report to the one or more product regulation servers $18_1$-$18_N$ corresponding to the one or more jurisdictions of interest. Each agency or other controlling entity in such one or more jurisdictions of interest is then operable, e.g., either manually or automatically via the corresponding product regulation servers $18_1$-$18_N$ or other information processors/processing circuits, to process such reports against the product regulations for the corresponding product in that jurisdiction and make a rapid determination of whether that product is regulation-eligible in that jurisdiction.

As another example, for any retail product deemed by the agency or other controlling entity in any jurisdiction of interest to not be regulation-eligible, the retail server 14 is, in some embodiments, alternatively or additionally operable to analyze the product's content data, i.e., data relating to the ingredients and quantities thereof in the retail product, against that of similar products that have been deemed regulation-eligible to determine whether that product, notwithstanding the violation of one or more rules of the product regulations for that product in that jurisdiction, should otherwise be regulation-eligible, e.g., in the WIC framework such a determination may be made if the overall nutritional content or value of the WIC rule violating food product is greater than or equal to that of a similar product that has previously been deemed WIC-eligible. If so, the retail server 14 is operable to compile the analysis results, produce a corresponding report and transmit the report to the one or more product regulation servers $18_1$-$18_N$ corresponding to the one or more jurisdictions of interest. Each agency or other controlling entity in such one or more jurisdictions of interest is then operable, e.g., either manually or automatically via the corresponding product regulation servers $18_1$-$18_N$ or other information processors/processing circuits, to process such reports against the product regulations for the corresponding product in that jurisdiction and make a determination of whether that product should indeed be otherwise regulation-eligible in that jurisdiction.

As another example, for any retail product deemed by the agency or other controlling entity in any jurisdiction of interest to not be regulation-eligible, and if further determined by the retail server 14 that it should not be otherwise regulation-eligible as just described, the retail server 14 is, in some embodiments, additionally operable to determine deviation(s) between the product's content data and the product regulations for the corresponding product in that jurisdiction and to process such deviation(s) to determine the feasibility of modifying one or more ingredients of that product sufficiently to satisfy the product regulations for that product in that jurisdiction. If feasible, that product may be reformulated according to the product reformulation determination so as to render the product regulation-eligible. The retail server 14 is then illustratively operable to re-execute the process described above to conduct an analysis to determine whether the reformulated product is regulation-eligible according to the product regulation rules for that product in each of the one or more jurisdictions of interest and, if so, to compile the analysis results, produce a corresponding report and transmit the report to the one or more product regulation servers $18_1$-$18_N$ corresponding to the one or more jurisdictions of interest. Each agency or other controlling entity in such one or more jurisdictions of interest is then again operable, e.g., either manually or automatically via the corresponding product regulation servers $18_1$-$18_N$ or other information processors/processing circuits, to process such reports against the product regulations for the corresponding product in that jurisdiction and make a determination of whether that reformulated product is regulation-eligible in that jurisdiction.

As another example, in some embodiments, the retail server 14 may be additionally or alternatively operable to analyze the product content data for any regulation-eligible retail product in a retail server database 28, to determine one or more characteristics thereof relevant to its regulation-eligibility in one or more jurisdictions, to then search the database 28 for similar retail products that are not currently regulation eligible but that satisfy or exceed the determined one or more features, and to then re-execute the process described above to conduct an analysis to determine whether such product is or should be regulation-eligible according to the product regulation rules for that product in each of the one or more jurisdictions of interest, etc.

As another example, in some embodiments, the retail server 14 may be additionally or alternatively operable to execute one or more processes to integrate the regulation-eligible status of any regulation-eligible retail product into one or more existing retail-related processes being executed by the retail server 14. Examples of such one or more processes include, but are not limited to, one or more processes to notify/enable a shelf strip/tag print module to print a regulation-eligible identifier on regulation-eligible product label fields, one or more processes to allow users of a retail website hosted by or for the retail server 14 to select product regulation preferences, e.g., to flag regulation-eligible products, to display virtual coupons for regulation-eligible products or the like, and one or more processes to store codes of regulation-eligible retail products for automatic detection of regulation-eligible products during customer purchase transactions at point-of-sale systems and/or web-based transaction interfaces.

It will be understood that any of foregoing features maybe carried out, i.e., executed by the retail server 14 and/or other server(s)/processor(s) as appropriate, alone or in any combination. In the description that follows, product regulations may be referred to, and/or described by example, in the context of Federal WIC and/or State WIC rules or requirements. It will be understood that such references and/or examples are provided only to facilitate an understanding of the principles of this disclosure, and should not be considered to be limiting in any way.

Referring again to FIG. 1, the retail server 14 may be embodied as any type of server or similar computing device capable of performing conventional functions thereof as well as the functions described herein. In the illustrative embodiment of FIG. 1, the retail server 14 includes a processor 22, an I/O subsystem 24, a memory 26, a data storage 28, a communication circuitry 30, one or more peripheral devices 32, one or more point-of-sale systems 34, a product development system 36 and one or more shelf strip and/or shelf tag printers 38. It should be appreciated that the retail server 14 may include other components, sub-components, and devices commonly found in a server and/or computing device, which are not illustrated in FIG. 1 for clarity of the description.

The processor 22 of the retail server 14 may be embodied as any type of processor capable of executing software/firmware, such as a microprocessor, digital signal processor, microcontroller, or the like. The processor 22 may be a single processor or include multiple processors. The I/O subsystem 24 of the retail server 14 may be embodied as conventional circuitry and/or components to facilitate input/output operations with the processor 22 and/or other components of the retail server 14. The processor 22 is communicatively coupled to the I/O subsystem 24.

The memory 26 of the retail server 14 may be embodied as or otherwise include one or more conventional volatile and/or non-volatile memory devices. The memory 26 is communicatively coupled to the I/O subsystem 24 via a number of signal paths. Although only a single memory device 26 is illustrated in FIG. 1, the retail server 14 may include additional memory devices in other embodiments. Various data and software may be stored in the memory 26. The data storage 28 is also communicatively coupled to the I/O subsystem 24 via a number of signal paths, and may be embodied as any type of device or devices configured for the short-term or long-term storage of data such as, for example, memory devices and circuits, memory cards, hard disk drives, solid-state drives, or other data storage devices.

The communication circuitry 30 of the retail server 14 may include any number of devices and circuitry for enabling communications between the retail sever 14 and the one or more product regulation servers $18_1$-$18_N$, and between the retail server 14 and the one or more third-party servers or systems 20. In the illustrated embodiment, the communication circuitry 30 is configured in a conventional manner to conduct wireless or wired communications between the retail server 14 and the one or more product regulation servers $18_1$-$18_N$ and/or the one or more third-party servers or systems 20 via the network 16. In one embodiment, the network 16 is a conventional private, e.g., secure, network, although in alternate embodiments the network 16 may be a conventional public network such as the Internet; i.e., a publicly accessible global system of interconnected computer networks. Generally, the communication circuitry 30 may be configured to use any one or more, or combination, of conventional secure and/or unsecure communication protocols to communicate with the one or more product regulation servers $18_1$-$18_N$ and/or the one or more third-party servers or systems 20. As such, the system 10 may include any number of additional devices, such as additional computers, routers, and switches, to facilitate such communications.

The peripheral devices 32 of the retail server 14 may include any number of conventional peripheral devices including for example, but not limited to, any number of input/output devices, interface devices, display monitors, audio and/or video processing devices, and/or other peripheral devices.

In embodiments in which the retail enterprise 12 includes one or more brick-and-mortar stores, the one or more point-of-sale systems 34 is/are illustratively located therein. In embodiments in which include multiple brick-and-mortar stores, at least one of the point-of-sale systems 34 is located in each. In any case, the one or more point-of-sale systems 34 are illustratively conventional clerk-assisted and/or self-checkout point-of-sale systems via which customers of a brick-and-mortar store may conduct sales transactions for the purchase of retail goods and/or services from the retail enterprise 12. The one or more point-of-sale systems 34 are communicatively coupled to the I/O system 24 such that the processor 22 of the retail server 14 can communicate with each of the one or more point-of-sale systems 34. In some embodiments, the processor 22 is operable to control retail transactions made through the point-of-sale systems 34, and in such embodiments the processor 22 may control the point-of-sale systems in whole or in part. In other embodiments, the point-of-sale systems 34 may control, at least in part, such retail transactions.

The product development system 36 is illustratively part of a product research and/or development portion of the retail enterprise 12 which operates, at least in part, to develop enterprise-brand products for retail sale by the retail enterprise 12. In the context of the food industry, for example, the product research and/or development portion of a retail food enterprise illustratively operates, at least in part, to develop own-brand food products for retail sale by the retail food enterprise. In any case, the product development system 36 illustratively includes one or more processors, servers, databases and/or other electronic system(s) for simulating product designs, aiding in the design of one or more products, evaluating or analyzing one or more components or ingredients of a product, comparing one or more components or ingredients of a product to those of one or more other products, and the like. The product development system 36 is communicatively coupled to the I/O system 24 such that the processor 22 of the retail server 14 can communicate with the product development system 36. In some embodiments, the processor 22 is operable to control one or more operations of the product development system 36, and in other embodiments one or more processors within the product development system is/are operable to control all operations of the product development system 36.

The one or more shelf strip and/or shelf tag printers 38 may include any number of printers for printing product information, e.g., product identification, pricing, etc., in and on product label fields of product shelf strips, product shelf tags, product shelf labels and the like. The one or more shelf strip and/or shelf tag printers 38 are communicatively coupled to the I/O system 24 such that the processor 22 of the retail server 14 can communicate with each of the one or more shelf strip and/or shelf tag printers 38. In some embodiments, the processor 22 is operable to control operations of one or more of the shelf strip and/or shelf tag printers 38, and in other embodiments one or more processors within one or more shelf strip and/or shelf tag printers 38 is/are operable to control at least some of the operations of the one or more shelf strip and/or shelf tag printers 38.

Figure 2:
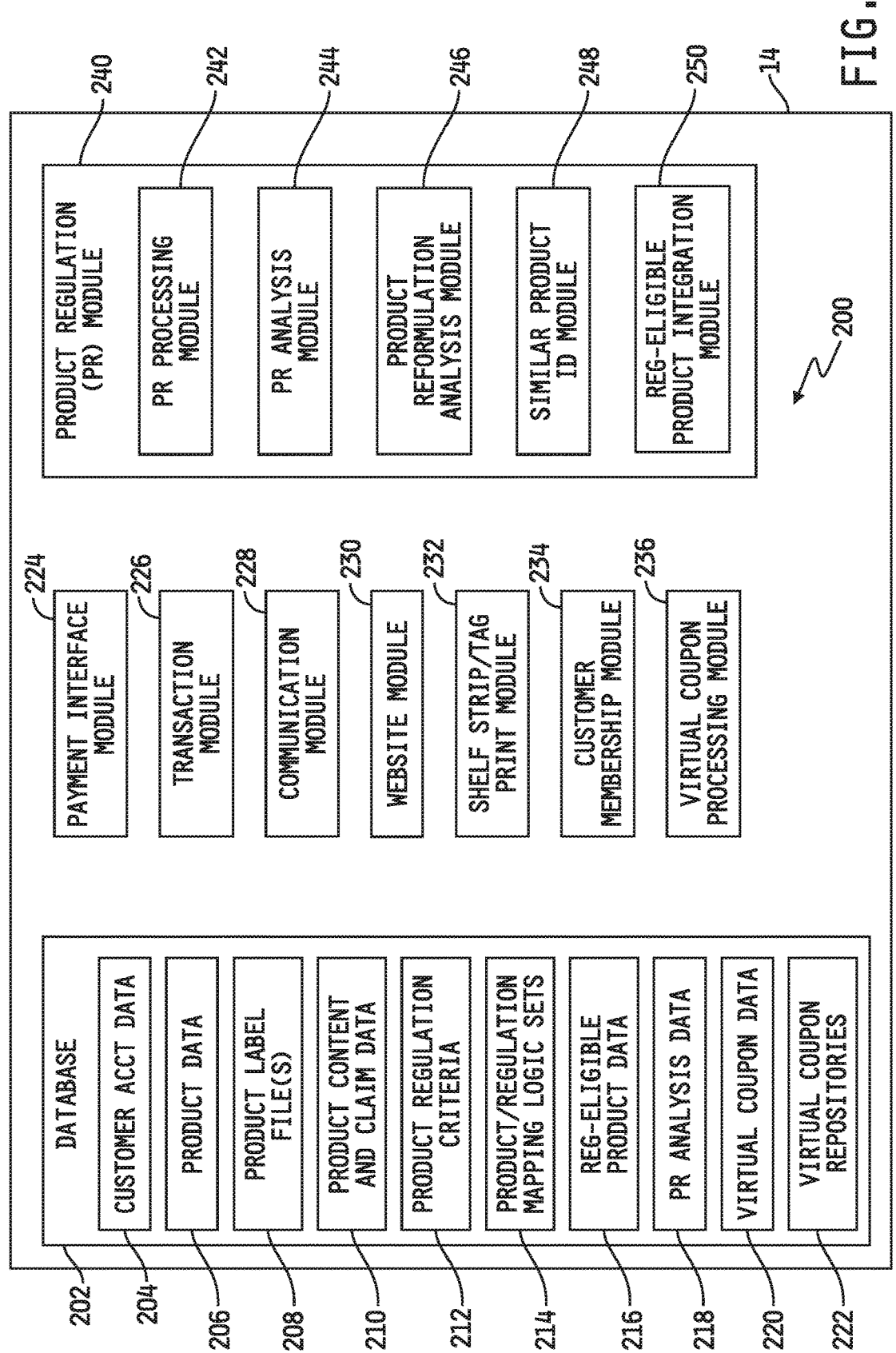
FIG. 2 is a simplified block diagram of an embodiment of a software environment of the retail server of FIG. 1.

Referring now to FIG. 2, a simplified block diagram is shown of an embodiment of an environment 200 of the retail server 614 illustrated in FIG. 1. In the embodiment shown in FIG. 2, the environment 200 includes a server database 202 which illustratively includes customer account data 204, product data 206, product label files 208, product content and claim data 210, product regulation criteria 212, product/regulation mapping logic sets 214, regulation-eligible product identification data 216, production regulation analysis data 218, virtual coupon data 220 and virtual coupon repositories 222.

Customers may elect to participate in an enterprise membership services (EMS) program offered, managed and maintained by the retail server 14 by establishing a customer account (which may be referred to herein as an "EMS account") within the customer account data 204, which may in some cases be an individual account accessible only by an individual person, e.g., an individual customer, and in other cases may be a group or "household" account accessible by each of a plurality of members of a predefined group of persons, e.g., members of a family or household, one or more employees of a business enterprise, etc. The terms "member," "customer" and "user," and variants thereof, are used interchangeably in the following description, and such terms should be understood to refer interchangeably to an individual customer or a predefined group of individual customers (referred to herein as a "household") who shop at and purchase items from the retail enterprise 12, and who are members of an enterprise membership service (EMS) of the type described herein and provided and managed by the retail enterprise 12.

Illustratively, a software application program is available for download from the retail server 14 for customers electing to access the EMS program via a computing device and/or a mobile communication device. Once downloaded and activated, customers of the retail enterprise 12 can access and manage their EMS account and other program features via the software application program executed by their computing devices and/or a mobile communication devices. The retail server 14 is illustratively operable to manage customer EMS accounts via a customer membership module 234 in a conventional manner.

Illustratively, the retail server 14 additionally includes a website module 230 via which the retail server 14 hosts and controls an EMS website or web-based interface accessible via the network 16 or other customer-accessible network. In such embodiments, customers of the retail enterprise 12 can access and manage their EMS accounts 204 and/or other program features by accessing their personal EMS page(s) of the EMS website or web-based interface hosted by the retail server 14 via their computing devices and/or mobile communication devices using a conventional internet browser. In some embodiments, the retail server 14 may further host a retail website via the website module 230 as described above, and in other embodiments such a retail website may be hosted for the retail enterprise 12 by another server or servers.

In the illustrated embodiment, the customer account data 204 of the server database 202 has stored therein information relating to customer accounts, including profile data for each of the customer-members of the EMS program. When a customer joins the EMS program, the server 14 establishes an EMS account within the customer account data 304 that is unique to that customer, and assigns to the customer, and/or the customer selects, a unique, corresponding enterprise membership services identification code, EMSID. The EMSID associated with each customer is entered into the server 14, is stored along with the customer's profile data in the customer account data 204, and the EMSID can be used thereafter to access the customer's EMS account. Each purchase made from the retail enterprise 12 at one of the point-of-sale systems 34, and/or via a payment interface of a retail website controlled and managed by the retail server 14 via the website module 230, in which the customer is identified to the point-of-sale system 34 or website payment interface (and thus to the retail server 14) is recorded in the customer account data 204 and associated with that customer's EMS account. Thus, the customer account data 204 contains for each customer member at least the customer's personal identification information, e.g., including name, address, email address, mobile telephone number, etc., the customer's associated EMSID, and purchase history for each item purchased by the customer for which the customer was identified to the retail server 14 as a customer-member of the EMS program, e.g., by providing the customer's EMSID to the point-of-sale system 34 or website payment interface before, during or after the purchase. In some embodiments, a customer's EMS account may further include an identifier which identifies the customer as eligible for purchase of regulation eligible products. In such embodiments, the EMS program will typically require an interactive vetting procedure in which customers may request inclusion of a regulation eligible product purchase identifier in their EMS customer account information and in which the retail enterprise 12 will include such identifiers in the EMS customer account information after determining customer eligibility therefor.

The product data portion 206 of the database 202 illustratively has stored therein information about each product currently being offered for sale, previously offered for sale and/or to be offered for sale in the future, to customers of and by the retail enterprise 14. The product information stored in the product data portion 206 of the database 202 illustratively includes product descriptive information for each product, which may include, but is not limited to, product category (e.g., ready-to-eat cereal, condiments, etc.), product type (e.g., tomato sauce, mustard, etc.), product brand, product size or weight, product and/or unit price, product identification code, and the like. Illustratively, the product identification code may be in the form of a conventional Uniform Product Code (UPC), although other conventional or proprietary product identification codes may alternatively or additionally be used.

The product label file(s) 208 illustratively has stored therein product label information relating to one or more labels attached to or otherwise associated with one or more of the products stored in the product data portion 206 of the database 202. The product label information stored in the product label file(s) 208 illustratively includes one or more images of one or more product labels, or portion(s) thereof, attached to or otherwise associated with one or more of the products stored in the product data portion 206 of the database 202.

The product content and claim data portion 210 of the database 202 illustratively has stored therein product characteristic identifiers relating to the content of and/or claims associated with one or more of the products stored in the product data portion 206 of the database 202. In one embodiment, the product characteristic identifiers stored in the product content and claim data portion 210 are determined from information provided on product labels, an example of which will be described in detail below, and in this embodiment the product characteristic identifiers for any product are determined from the product label information for that product stored in the product label file(s) 208. In other embodiments, the product characteristic identifiers may alternatively or additionally be determined from information provided on the products themselves (i.e., apart from the one or more product labels affixed thereto or otherwise associated therewith), from information provided by the product manufacturer and/or from other information relating to the product from one or more other sources of information. In some embodiments, the product characteristic identifiers for one or more products stored in the product portion 206 of the database 202 may be determined by a third party and provided to the retail server 14 by, e.g., a corresponding third party server 20. Alternatively or additionally, the retail server 14 may be configured to determine the product characteristic identifiers for one or more of the products.

In any case, for any product stored in the product data portion 206 of the database 202, the associated product characteristic identifiers illustratively include one or any combination of at least one product content identifier, at least one identified product claim and/or at least one derived product claim. The at least one product content identifier illustratively identifies for a product an amount, e.g., in the form of total amount, unit amount, percentage relative to a standard (e.g., in the context of food items, daily value (DV), recommended daily allowance (RDA), adequate intake (AI) or the like), etc., of an ingredient, element or nutritional component. In the context of food items, examples of ingredients may include, but are not limited to, sugar, corn syrup, or the like, examples of elements may include, but are not limited to, chemical elements such as iron, calcium, etc., and examples of nutritional components may include, but are not limited to, fiber, cholesterol, protein, etc. The at least one identified product claim illustratively identifies for a product a claim about the product identified on the product and/or its product label. In the context of food items, examples of identified product claims may include, but are not limited to, gluten free, whole grain, sugar free, lactose free or the like. The at least one derived product claim illustratively identifies for a product a claim about the product that is not identified on the product or it's label but which is derived from one or more of the existing product characteristic identifiers. In the context of a food item such as bacon, a non-limiting example of a derived product claim may be "gluten free," which claim is illustratively derived from the inherent nature of the product in combination with an analysis of the other product characteristic identifiers depicted on the product label and/or the product packaging.

The product regulation criteria portion 212 of the database 202 illustratively has stored therein product regulation criteria, e.g., in the form of product regulation rule sets, which define product regulation standards for a plurality of retail products in one or more jurisdictions. Illustratively, the product regulation criteria portion 212 of the database 202 includes product regulation criteria for the plurality of retail products in each jurisdiction in which the retail enterprise 12 has at least one brick-and-mortar store or in which the retail enterprise otherwise conducts retail sales of their products. In one embodiment, the product regulation criteria are organized by jurisdiction, and within each jurisdiction by product category. Those skilled in the art will recognize other ways of organizing product regulation criteria within the product regulation criteria portion 212 of the database 202, and it will be understood that any such alternate ways are intended to fall within the scope of this disclosure.

In the context of the WIC example described above, the product regulation criteria portion 212 of the database 202 illustratively includes, in one embodiment, a Federal WIC rule set for product categories matching those of some or all of the products stored in the product data portion 206 for which such Federal WIC rule sets exist, as well as State WIC rule sets for such product categories for each state in which the retail enterprise 12 has at least one brick-and-mortar store or in which the retail enterprise otherwise conducts retail sales of their products. In alternate embodiments, the Federal WIC rule set may be omitted such that the product regulation criteria portion 212 of the database 202 includes only the State WIC rule sets. In some embodiments, such WIC rule sets are organized in the database by State, and within each State by product category, although in other embodiments the WIC rule sets may be organized differently.

The product/regulation mapping logic portion 214 of the database 202 illustratively has stored therein a plurality of logic maps for mapping product characteristic identifiers (stored in the product content and claim data 208 portion of the database 202) for one or more of the products stored in the product data portion 206 of the database 202 to corresponding product regulation rules of one or more applicable product regulation rule sets stored in the product regulation criteria portion 212 of the database 202. Illustratively, product/regulation mapping logic portion 214 of the database 202 includes a plurality of sets of such logic maps for each jurisdiction in which the retail enterprise 12 has at least one brick-and-mortar store or in which the retail enterprise otherwise conducts retail sales of their products. In the context of the WIC example described above, the product/regulation mapping logic portion 214 of the database 202 illustratively includes, in one embodiment, a plurality of sets of logic maps for mapping product characteristic identifiers for one or more of the products stored in the product data portion 206 of the database 202 to one or more rules of a corresponding category of the one or more Federal WIC rule sets, as well as a plurality of sets of logic maps for mapping product characteristic identifiers for the one or more products to one or more rules of a corresponding category of State WIC rule sets for each state in which the retail enterprise 12 has at least one brick-and-mortar store or in which the retail enterprise otherwise conducts retail sales of their products. In embodiments in which the Federal WIC rule set is omitted, the corresponding plurality of sets of logic maps for mapping product characteristic identifiers thereto may likewise be omitted. By way of illustration, a simplified and non-limiting example of a set of product characteristic identifiers, a set of Federal WIC rule sets and a corresponding logic map will be provided below.

The regulation-eligible product data portion 216 of the database 202 illustratively has stored therein identifiers of regulation-eligible products deemed by a product regulation authority, e.g., product regulation agency or other entity, to be regulation-eligible. The regulation-eligible product identifiers may illustratively be provided to the retail server 14 by one or more of the product regulation servers $18_1$-$18_N$ for storage by the processor 22 in the data portion 216, or may alternatively or additionally be provided via one or more alternate sources and stored by the processor 22 in the data portion 216 manually or automatically. In one embodiment, the regulation-eligible product identifiers may be or include one or more conventional identifiers. As one example, the regulation-eligible product identifiers may be or include the UPCs of regulation-eligible products. Other regulation-eligible product identifiers will occur to those skilled in the art, and it will be understood that such other regulation-eligible product identifiers are intended to fall within the scope of this disclosure. In any case, the retail server 14 is illustratively operable, as will be described in detail below, to periodically or otherwise compare the regulation-eligible identifiers stored in the regulation-eligible product data portion 216 of the database 202 with the product data stored in the product data portion 206 of the database 202, and to mark the product data of each product in the product data portion 206 having a matching regulation-eligible identifier as regulation-eligible. In one embodiment, the retail server 14 is operable to mark the product data of such regulation-eligible products in the product data portion 206 with a suitable flag or other data inserted therein and/or appended thereto, in order to distinguish regulation eligible products from regulation ineligible products in the product data portion 206 of the database. Those skilled in the art will recognize other mechanisms for distinguishing regulation eligible products from regulation ineligible products in the product data portion 206 of the database 202, and it will be understood that any such other mechanisms are intended to fall within the scope of this disclosure.

As will be described in detail below, the retail server 14 is operable to analyze product characteristic identifiers against product regulation criteria for one or more products stored in the product data portion 206 of the database 202 that have not, or have not yet, been deemed, e.g., by one or more product regulation authorities, to be regulation-eligible in order to determine whether such one or more products meet applicable product regulation criteria before requesting review thereof by the one or more product regulation authorities. In some embodiments, the retail server 14 is operable to further analyze product characteristic identifiers against product regulation criteria for one or more such products which the retail server 14 first determines has not met the product regulation criteria in one or more jurisdictions to further determine whether, for one or more reasons (examples of which will be provided below), such one or more products should otherwise be regulation-eligible before requesting review thereof by the one or more corresponding product regulation authorities. In either case, the regulation-eligible product data portion 216 of the database 202 further illustratively has stored therein identifiers of such products pending determination of regulation-eligibility by one or more product regulation authorities. As one example, such regulation-eligible product identifiers may be the same as described above, e.g., UPCs or other product identifier(s), suitably marked by the processor 22 of the retail server 14, e.g., with a flag or other data inserted therein and/or appended thereto, to distinguish such product identifiers from the regulation-eligible product identifiers of products that have already been deemed by a product regulation authority, e.g., product regulation agency or other entity, to be regulation-eligible.

The PR analysis data portion 218 of the database 202 illustratively has stored therein the results of the analyses just described with respect to the regulation-eligible product data 216. Such results illustratively include reports for each product for which review thereof will be requested by the one or more product regulation authorities. In the context of the WIC example, each product for which WIC eligibility review is sought will have a separate report in the data portion 218 of the database 202 for each State in which the WIC eligibility review is requested. In one embodiment, such reports may be automatically generated by the retail server 14 and/or automatically transmitted to one or more of the product regulation servers 18$_1$-18$_N$. In alternate embodiments, such reports may be at least partially prepared by an employee or consultant of the retail enterprise 12, and/or be manually transmitted to one or more of the product regulation servers 18$_1$-18$_N$.

The virtual coupon data 220 illustratively has stored therein virtual coupons for one or more of the products stored in the product data portion 206 of the database 202. Such virtual coupons may be generated by the retail server 14 and/or received from one or more third parties. Illustratively, the number, product categories and/or product types of virtual coupons stored in the virtual coupon data 220 may change periodically, e.g., daily, weekly, monthly, etc. One or more of the virtual coupons stored in the virtual coupon data 220 any point in time may be eligible for redemption by a qualified customer against one or more corresponding regulation-eligible products.

The virtual coupon repositories 222 illustratively include separate or separately identifiable portions of the database 202 each assigned to a different customer-member of the EMS and in which virtual coupons unique to that customer-member or uniquely selected by that customer-member are stored. When conducting purchase transactions, e.g., at one of the point-of-sale systems 34 and/or at a payment interface of a retail website hosted by or for the retail server 14, in which such a customer-member's EMS identifier is provided to the retail server 14, the point-of-sale system 34, payment interface of the retail website and/or retail server 14 is/are operable in a conventional manner to automatically redeem virtual coupons stored in that customer-member's virtual coupon repository 222 against applicable items in the purchase transaction.

The environment 200 of the retail server 14 further includes a payment interface module 224, a transaction module 226, a communication module 228, a shelf strip/tag print module 232 and a virtual coupon processing module 236. In one embodiment, the payment interface module 224 is configured, in a conventional manner, to process tangible forms of electronic payment systems (EPS), e.g., tangible electronic funds transfer instruments such as credit cards, debit cards, etc., used at the point-of-sale system(s) 34 and/or purchase interface of a retail website hosted by or for the retail enterprise 12 for the purchase of goods and/or services. In an example of embodiment that may be used in a brick-and-mortar store of the retail enterprise 12, the payment interface module 224 illustratively is or includes a conventional magnetic strip reading device configured to read payment information stored in magnetic form on a strip affixed to a conventional credit or debit card. Alternatively or additionally, the payment interface module 224 may be or include one or more other conventional devices or mechanisms for transferring or facilitating the transfer of electronically readable customer payment system (EPS) information stored on other electronic or non-electronic media, and/or stored on, or accessible by, a mobile communication device and/or computing device used by a customer of the retail enterprise 12.

The transaction module 226 is configured to monitor purchases of products and services made by shopper members of the EMS program using any of the point-of-sale systems 34 and/or payment interface of a retail website hosted by or for the retail enterprise 12, and to store purchase transaction data associated with such purchases in the customer records data 204. As described above, the customer account data 204 is illustratively partitioned or otherwise configured to store such purchase transaction data in a manner that provides for the separate tracking and identification of purchase history of each customer member.

The communication module 228 is configured, in a conventional manner, to control and manage all communications between the retail server 14 and the one or more product regulation servers 18$_1$-18$_N$ and to control and manage all communications between the retail server 14 and any third party server(s) 20.

The shelf strip/tag print module 232 is illustratively operable to control the one or more shelf strip and/or shelf tag printers 38 to print shelf strips, tags and/or labels for placement on, and/or to be affixed or otherwise mounted to, product shelves within one or more brick-and-mortar stores of the retail enterprise 12. The shelf strips, tags and/or labels illustratively include product information, e.g., product identification, pricing, etc., in and on product label fields thereof for identifying co-located products. In some embodiments, as will be described below, the shelf strip/tag print module 232 is further illustratively operable to control one or more of the shelf strip and/or shelf tag printers 38 to print product regulation information in the product label fields of one or more products deemed to be regulation-eligible.

The virtual coupon processing module 236 is configured to facilitate control by customers of the content of their virtual coupon repositories, e.g., via their EMS pages of the EMS website, to appropriately mark virtual coupons selected for redemption by such customers and to facilitate automatic redemption of such virtual coupons against products and/or services purchased by customers at any of the point-of-sale systems 34 and/or via a purchase interface of a retail website hosted by or for the retail enterprise 12.

The environment 200 of the retail server 14 further illustratively includes a product regulation (PR) module 240 which illustratively includes a product regulation processing module 242, a product regulation analysis module, a product reformulation analysis module 246, a similar product identification module 248 and a regulation-eligible product integration module 248.

Figure 3:
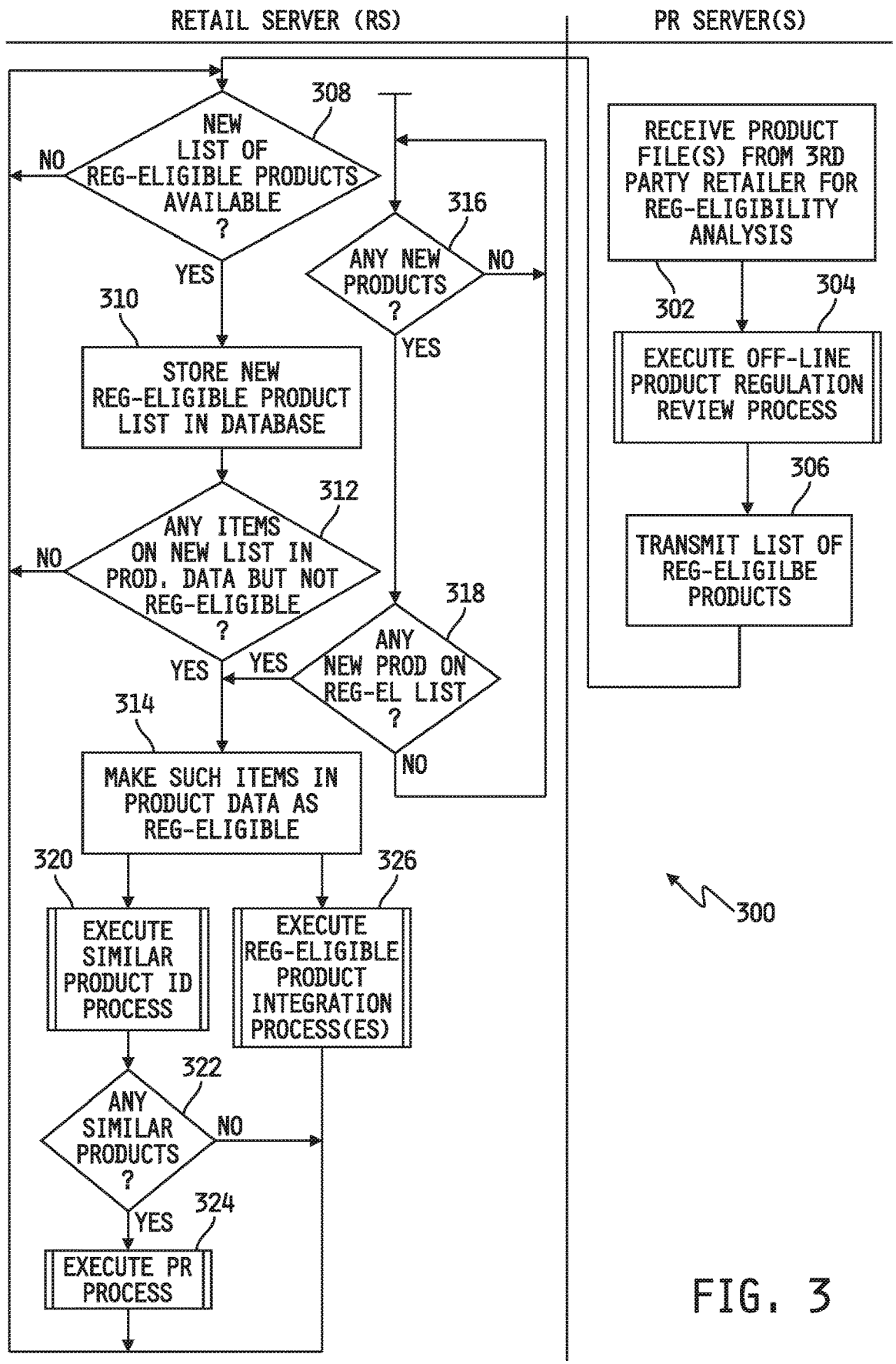
FIG. 3 is a simplified flow diagram of an embodiment of a product regulation process for processing retail product information relative to regulation-eligible retail product information.
Figure 5:
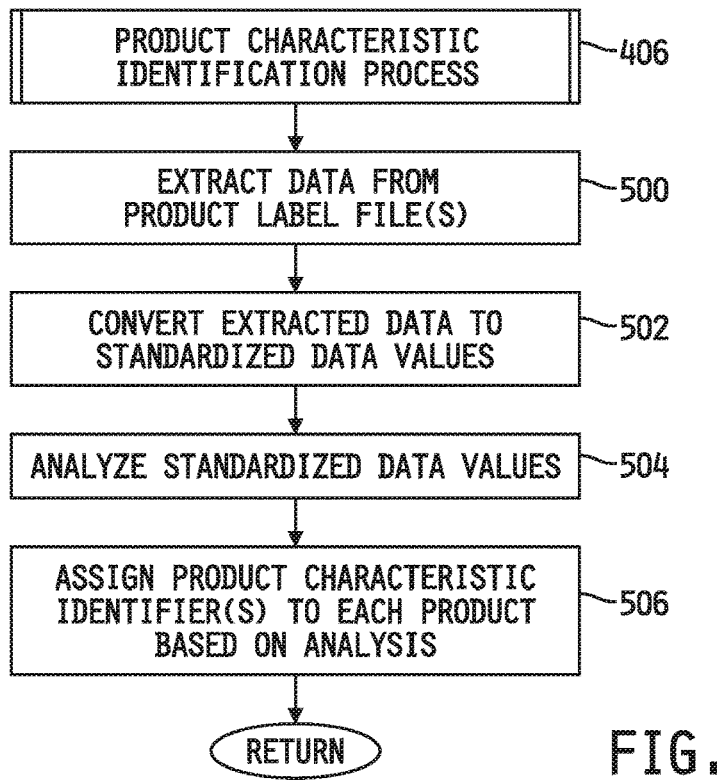
FIG. 5 is a simplified flow diagram of an embodiment of the product content and claim determination process illustrated in FIG. 4.

The product regulation processing module 242 is illustratively operable to process retail product information, i.e., information relating to existing products and/or new products offered for sale, and/or products to be offered for sale in the future, by the retail enterprise 12, relative to current regulation-eligible retail product information, i.e., relative to one or more lists of retail products that have previously been deemed eligible for purchase according to one or more sets of jurisdiction-based product regulations, e.g., governmental or otherwise, to determine whether such products are currently eligible for purchase according to such product regulations in one or more jurisdictions. For any such retail products not found on the current list of regulation-eligible retail products in one or more jurisdictions of interest, the product regulation processing module 242 is further illustratively operable to execute a process for processing product information for such retail products in view of corresponding jurisdiction-based product regulation rules to determine whether the retail product is regulation-eligible according to the product regulation rules for that product in each of the one or more jurisdictions of interest. Example embodiments of such processes executed by the product regulation processing module 242 are illustrated in FIGS. 3, 4 and 5, and such process will be described in detail hereinafter.

Figure 6A:
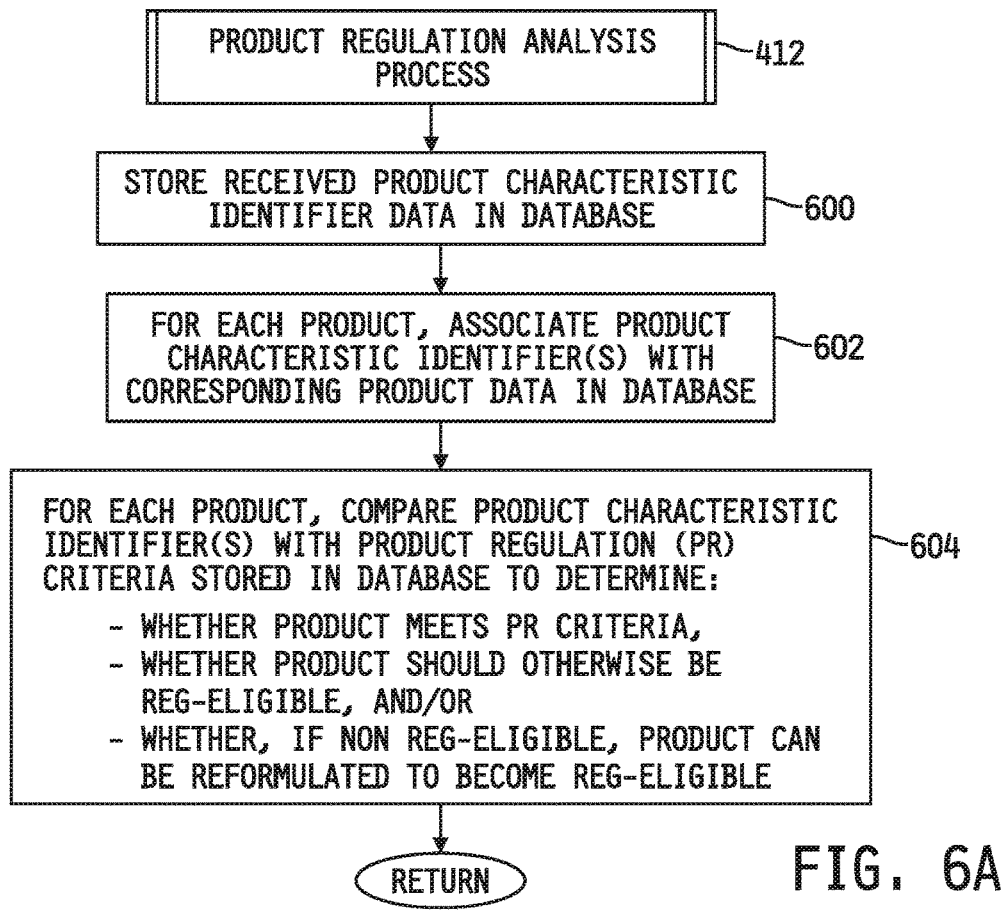
FIG. 6A is a simplified flow diagram of an embodiment of the product regulation analysis process illustrated in FIG. 4.
Figure 6B:
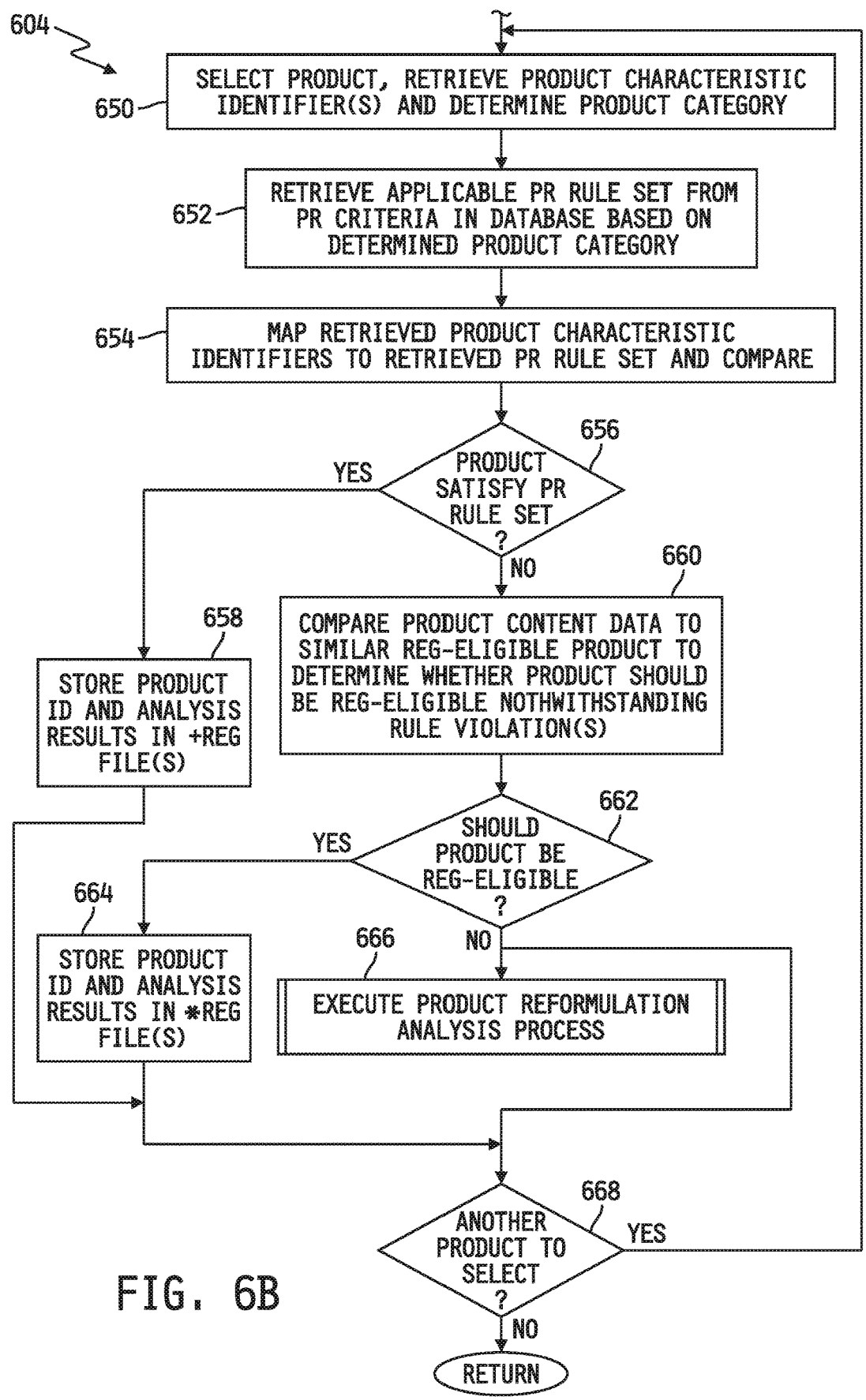
FIG. 6B is a simplified flow diagram of an embodiment of the product comparison process illustrated in FIG. 6A.

The product regulation analysis module 244 is illustratively operable to analyze product information for retail products not found on a current list of regulation-eligible retail products in one or more jurisdictions of interest against corresponding jurisdiction-based product regulation rules to determine whether the retail product is regulation-eligible according to the product regulation rules for that product in each of the one or more jurisdictions of interest. Example embodiments of processes executed by the product regulation analysis module 244 are illustrated in FIGS. 6A and 6B, and such process will be described in detail hereinafter.

Figure 6C:
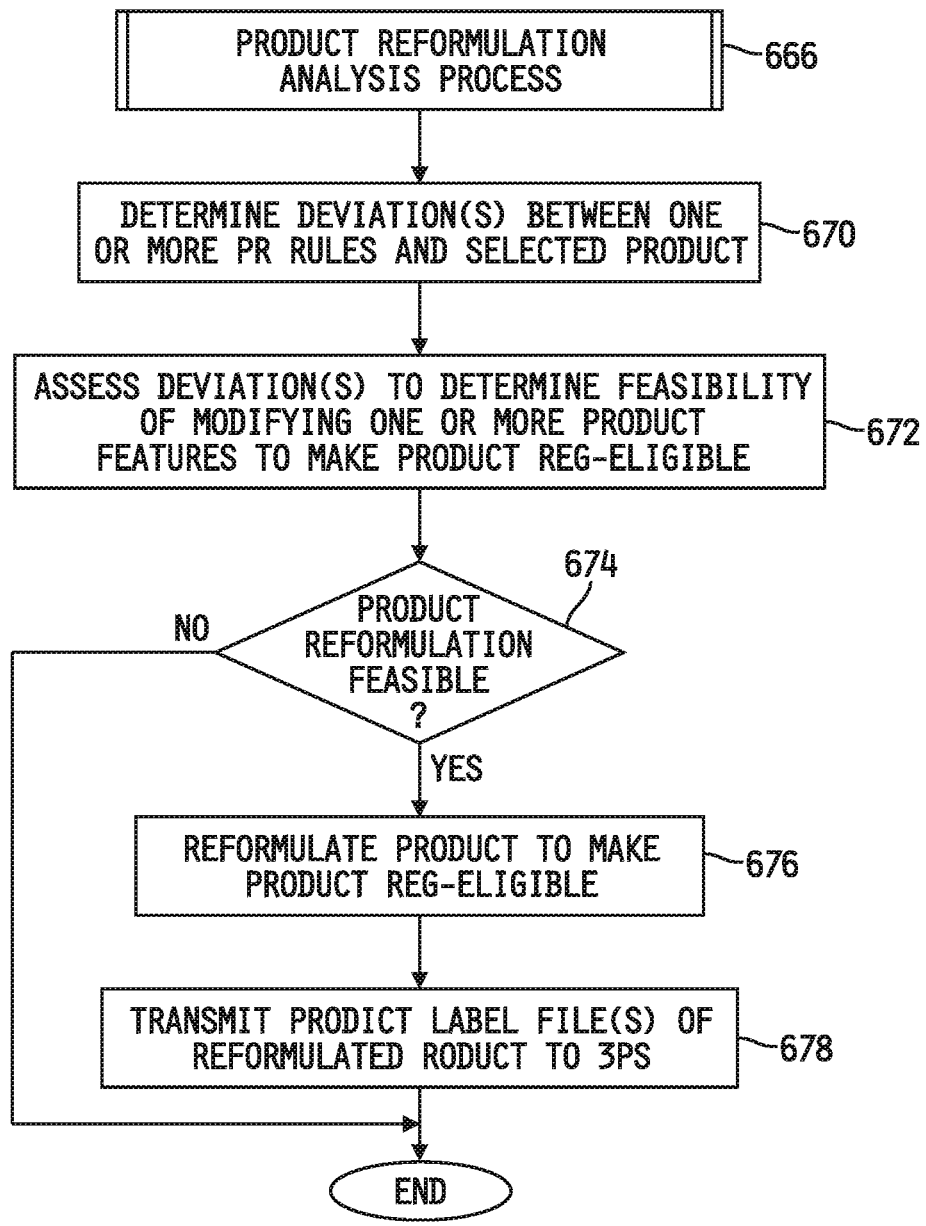
FIG. 6C is a simplified flow diagram of an embodiment of the product reformulation process illustrated in FIG. 6B.

The product reformulation analysis module 246 is illustratively operable to analyze retail products deemed by an agency or other controlling entity in any jurisdiction of interest to not be regulation-eligible, and in some cases further determined by the retail server 14 to not be otherwise regulation-eligible, to determine the feasibility of reformulating such products so as to satisfy the product regulations for that product in one or more jurisdictions of interest and, if feasible, to reformulate such products and repeat the product regulation processes executed by the modules 242 and 246. An example embodiment of a process executed by the product reformulation analysis module 246 is illustrated in FIG. 6C, and such a process will be described in detail hereinafter.

Figure 7:
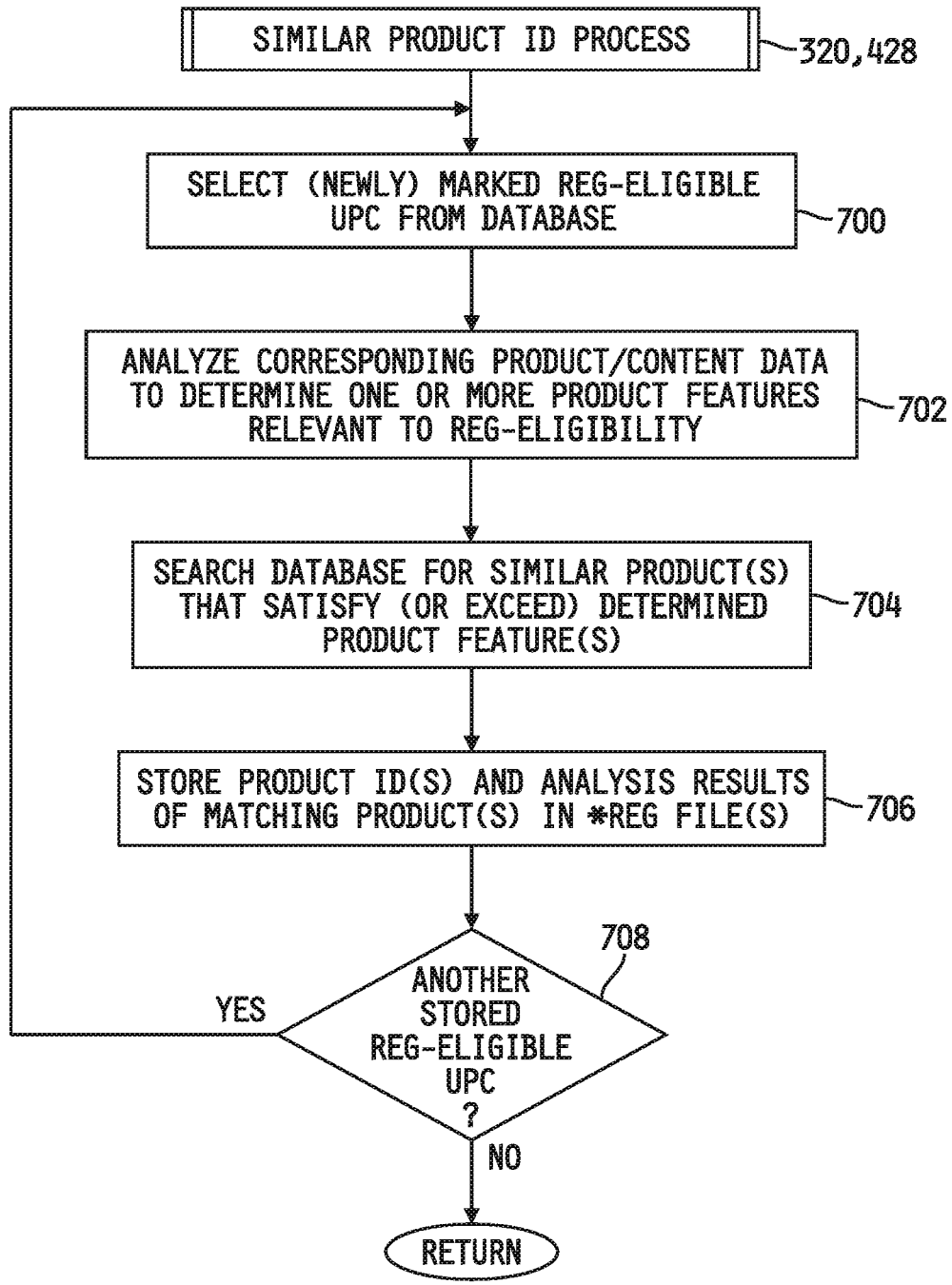
FIG. 7 is a simplified flow diagram of an embodiment of the similar product identification process illustrated in FIG. 4.

The similar product identification module 248 is illustratively operable to analyze product content data for any regulation-eligible retail product in the regulation-eligible product data 216 to determine one or more features thereof relevant to its regulation-eligibility in one or more jurisdictions, to then search the product data 206 for similar retail products that are not currently regulation eligible but that satisfy or exceed the determined one or more features, and to then re-execute the processes executed by the modules 242 and 244 to determine whether the such products should be regulation-eligible according to the product regulation rules for that product in each of the one or more jurisdictions of interest. An example embodiment of a process executed by the similar product identification module 248 is illustrated in FIG. 7, and such a process will be described in detail hereinafter.

Figure 8:
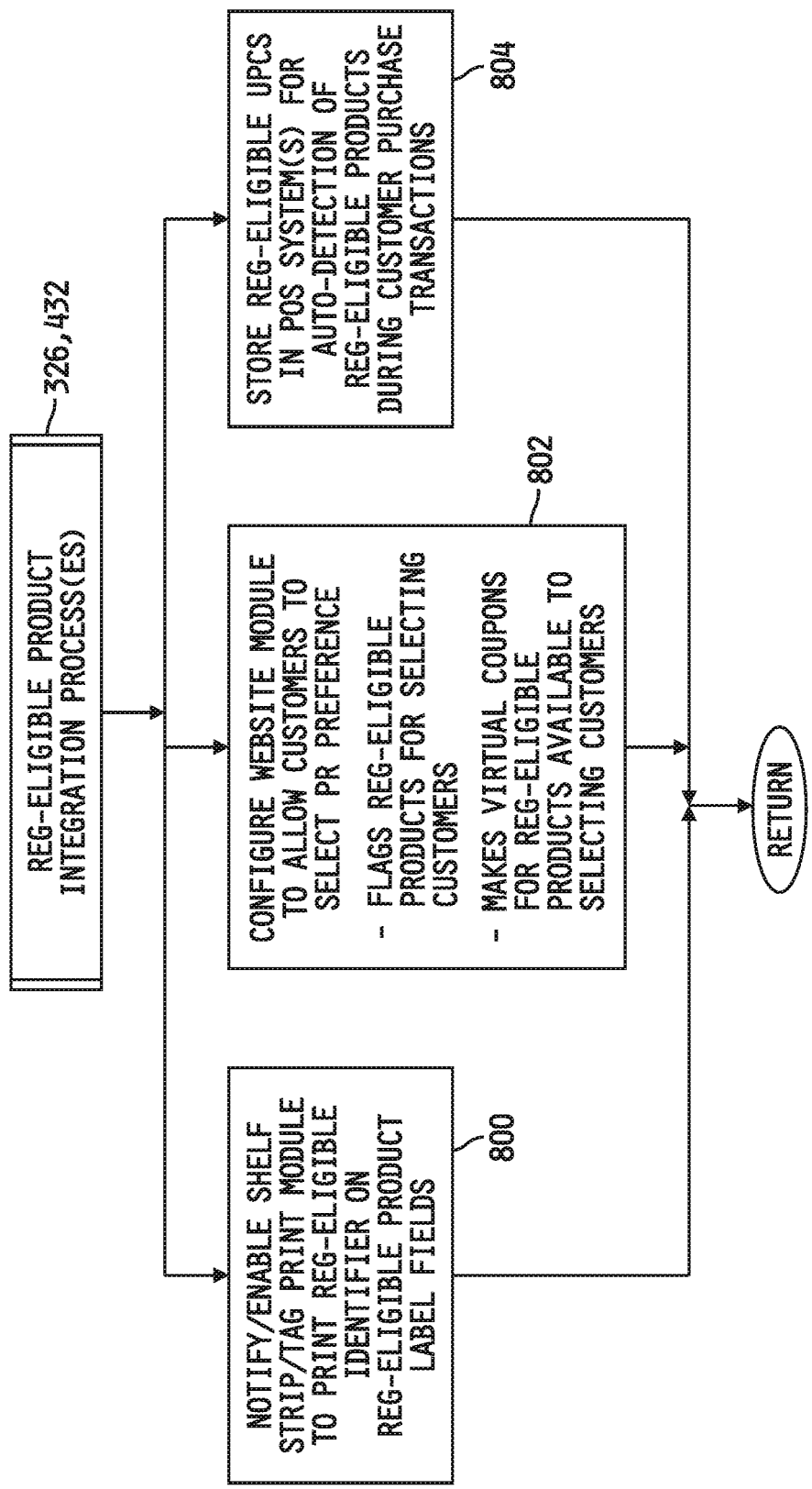
FIG. 8 is a simplified flow diagram of an embodiment of the regulation-eligible product integration process illustrated in FIG. 4.

The regulation-eligible product integration module 250 is illustratively operable to execute one or more processes to integrate the regulation-eligible status of any regulation-eligible retail product into one or more existing retail-related processes being executed by the retail server 14. An example embodiment of a process executed by the similar product identification module 250 is illustrated in FIG. 8, and such a process will be described in detail hereinafter.

Referring now to FIG. 3, a simplified flow diagram is shown of a process 300 for processing retail product information, i.e., information relating to existing products and/or new products offered for sale, and/or products to be offered for sale in the future, by the retail enterprise 12, relative to current regulation-eligible retail product information, i.e., relative to one or more lists of retail products that have previously been deemed eligible for purchase according to one or more sets of jurisdiction-based product regulations, e.g., governmental or otherwise, to determine whether such products are currently eligible for purchase according to such product regulations in one or more jurisdictions. As indicated by the framework of the process 300 illustrated in FIG. 3, a portion of the process 300, i.e., the portion to the left of the central vertical line and centered under the heading "Retail Server (RS)," illustratively represents one or more software applications executed by the processor 22 of the retail server 14. In one embodiment, this portion of the process 300 is stored in the product regulation processing module 242 (see FIG. 2) in the form of instructions executable by the processor 22 of the retail server 14. The process steps of this portion of the process 300 will thus be described below for purposes of this disclosure as being executed by the processor 22 the retail server 14.

Another portion of the process 300, i.e., the portion to the right of the central vertical line and centered under the heading "PR Server(s)," illustratively represents one or more software applications executed by a processor of one or more of the product regulation servers $18_1$-$18_N$. In one embodiment, this portion of the process 300 is stored in a memory of one or more of the product regulation servers $18_1$-$18_N$ in the form of instructions executable by one or more processors of the one or more product regulation servers $18_1$-$18_N$. The process steps of this portion of the process 300 will be described below for purposes of this disclosure as being executed by at least one processor of one or more of the product regulation servers $18_1$-$18_N$.

In the embodiment illustrated in FIG. 3, the process 300 begins at step 302 in which one or more of the product regulation servers $18_1$-$18_N$ is/are operable to receive one or more product files from one or more $3^{rd}$ party retailers for regulation-eligibility analysis thereof. In the context of the WIC example described above, a Federal WIC server and/or one or more State WIC servers $18_1$-$18_N$ may be operable at step 302 to receive food product files from one or more $3^{rd}$ party food retailers, wherein the food product files are typically in the form of images of one or more labels affixed to or otherwise associated with corresponding food products. In any case, the process 300 advances from step 302 to step 304 where the one or more product regulation servers $18_1$-$18_N$ is/are operable to execute an off-line product regulation (PR) review process to determine whether the products identified by the received product file(s) is/are regulation-eligible. The off-line process executed at step 304 is illustratively a manual one in which one or more employees, consultants and/or agents of the entities which regulate the product(s) identified by the received product files(s), in accordance with one or more product regulation programs, manually compare the information in the received product file(s) with corresponding product regulation rules established by or for such entities. In other embodiments, the process executed at step 304 may be carried out, in whole or in part, by at least one processor of one or more of the product regulation servers $18_1$-$18_N$. In any case, the process 300 advances from step 304 to step 306 where the one or more product regulation servers $18_1$-$18_N$ is/are operable to transmit one or more lists of regulation-eligible ones of the received product file(s). Such one or more lists are illustratively transmitted not only to the requesting $3^{rd}$ party retailer (s) but also to the retail server 14 illustrated in FIG. 1.

Following step 306, the process 300 advances to step 308 where the processor 22 of the retail server 14 is operable to monitor the communication circuitry 30 to determine whether and when a new list of regulation-eligible products, as requested by any of a plurality of third party retailers, is available, i.e., whether and when any such new list of regulation-eligible products has been transmitted to the retail server 14 by any of the one or more product regulation servers $18_1$-$18_N$. If, at step 308, the processor 22 of the retail server 14 determines that no such new list is available, the process 300 continues to loop to the beginning of step 308. Otherwise, if the processor 22 of the retail server 14 determines at step 308 that a new list of regulation-eligible products is available, the process 300 advances to step 310 where the processor 22 is operable to store the new regulation-eligible product list in the database 202, e.g., in the regulation-eligible product data 216. Thereafter at step 312, the processor 22 is operable to determine whether any items in the new list received at step 308 are in the product data 206 but not marked as regulation-eligible. If not, this means that the items, i.e., products, in the new regulation-eligible product list received at step 308 are either not products of the retail enterprise 12 currently in the product data portion 206 of the database 202, or are products of the retail enterprise 12 currently in the product data portion 206 of the database 202 but currently marked therein as regulation-eligible. In either case, the process 300 illustratively loops back to step 308 to monitor the communication circuitry 30 for receipt of a new list of regulation-eligible products.

If at step 312, the processor 22 determines that one or more items in the new list of regulation-eligible products received at step 308 match(es) one or more corresponding products in the product data portion 206 of the database 202 that is not currently marked as regulation-eligible, the process 300 advances to step 312 where the processor 22 is operable to mark such one or more items in the product data portion 206 of the database 202 as regulation-eligible. In the context of the WIC example described above, the processor 22 is illustratively operable at step 314 to mark such one or more items in the product data portion 206 of the database 202 as WIC eligible in the state from which the new list of regulation eligible products was received at step 308, i.e., in the state corresponding to that associated with the one of the product regulation servers $18_1$-$18_N$ from which the list was received. In one embodiment of this WIC example, each product stored in the product data portion 206, or at least each product stored in the product data portion 206 which could potentially be WIC eligible, e.g., a food product, illustratively includes as part of or appended thereto a number of state WIC bits or fields equal to the number of states in which that product is offered for sale by the retail enterprise 12. In such embodiments, the processor 22 is illustratively operable to execute step 312 by setting a flag or similar marker in the field or bit which corresponds to the state from which the new list of regulation eligible products was received at step 308.

Independently of receipt and processing of any new list of regulation-eligible products, the process 300 illustratively includes steps 316 and 318 which operate to integrate the processing of new retail products into the process 300. In the illustrated embodiment, the processor 22 is illustratively operable at step 316 to monitor the product data portion 206 of the database 202 to determine whether any new retail products have been added thereto since the previous execution of step 316. If not, step 316 is continually executed until the processor 22 determines that at least one such new product has been added. Thereafter at step 318, the processor 22 is operable to determine whether any of the new products detected at step 318 are on any regulation-eligible list previously stored in the regulation-eligible product data portion 216 of the database 202. If so, the process 300 advances from step 318 to step 314, and otherwise the process 300 advances from the "NO" branch of step 318 to the beginning of step 316.

Following step 314, the process 300 illustratively advances to step 320 where the processor 22 of the retail server 14 is illustratively operable to execute a similar product identification process. An example embodiment of the similar product identification process executed at step 320 is illustrated in FIG. 7 and will be described in detail below. Following step 320, the process 300 advances to step 322 where the processor 22 of the retail server 14 is operable to determine whether any similar products were found in the similar product identification process executed at step 320. If so, the process 300 advances to step 324 where the processor 22 of the retail server 14 is illustratively operable to execute a product regulation (PR) process. An example embodiment of the product (PR) regulation process executed at step 324 is illustrated in FIG. 4 and will be described in detail below.

Also following step 314, the process 300 illustratively advances to step 326 where the processor 22 of the retail server 14 is illustratively operable to execute one or more regulation-eligible product integration process(es). Example embodiments of the one or more regulation-eligible product integration process(es) executed at step 326 are illustrated in FIG. 8 and will be described in detail below. Following execution of steps 324 and 326, as well as following the "NO" branch of step 322, the process 300 illustratively loops back to step 308.

Referring now to FIG. 4, a simplified flow diagram is shown of the product regulation (PR) process 324 illustrated in FIG. 3. It will be understood that the process 324 illustrated in FIG. 4 may be executed as part of the process 300 illustrated in FIG. 3, and/or on its own, i.e., independently of the process 300, at any time and/or periodically. In any case, the processor 22 is illustratively operable, under the direction of the process 324, to map and compare product information for retail products to corresponding jurisdiction-based product regulation rules to determine whether such retail products are regulation-eligible according to the product regulation rules for such products in each of one or more jurisdictions of interest. As indicated by the framework of the process 324 illustrated in FIG. 4, a portion of the process 300, i.e., the portion to the left of the left-most vertical line and centered under the heading "Retail Server (RS)," illustratively represents one or more software applications executed by the processor 22 of the retail server 14. In one embodiment, this portion of the process 324 is stored in the product regulation processing module 242 (see FIG. 2) in the form of instructions executable by the processor 22 of the retail server 14. The process steps of this portion of the process 324 will thus be described below for purposes of this disclosure as being executed by the processor 22 the retail server 14.

Another portion of the process 324, i.e., the portion to the right of the right-most vertical line and centered under the heading "PR Server(s)," illustratively represents one or more software applications executed by a processor of one or more of the product regulation servers $18_1$-$18_N$. In one embodiment, this portion of the process 324 is stored in the memory of one or more of the product regulation servers $18_1$-$18_N$ in the form of instructions executable by one or more processors of the one or more product regulation servers $18_1$-$18_N$. The process steps of this portion of the process 324 will be described below for purposes of this disclosure as being executed by at least one processor of one or more of the product regulation servers $18_1$-$18_N$.

Yet another portion of the process 324 i.e., the portion between the left-most and right-most vertical lines and centered under the heading "Third Party Server (3PS)," illustratively represents one or more software applications executed by a processor 40 of at least one third party server 20. In one embodiment, this portion of the process 324 is stored in the memory 44 and/or data storage 46 of at least one third party server 20 in the form of instructions executable by the processor 40 of the at least one third party server 20. The process steps of this portion of the process 324 will be described below for purposes of this disclosure as being executed by the processor 40 of at least one third party servers 20.

In the embodiment illustrated in FIG. 4, the process 324 may be executed for a single product stored in the product data portion 206 of the database 202 or multiple such products. In any case, the one or more such products are generally those which could possibly be regulation-eligible but which are not marked as such in the product data 206 for one or more jurisdictions in which the product(s) is/are offered for sale by the retail enterprise 12. In the context of the WIC example described above, products for which the process 324 will be executed are generally food products which are not marked as WIC-eligible in one or more states in which such food products are offered for sale by the retail enterprise 12.

The process 324 illustratively begins at step 400 where the processor 22 of the retail server 14 is operable to retrieve the product label file(s) for the one or more products from the product label file(s) 208 of the database 202. Thereafter at step 402, the processor 22 of the retail server 14 is operable, in one embodiment, to control the communication circuitry 30 to transmit the retrieved product label file(s) to the third party server (3PS) 20. Thereafter at step 404, the processor of the third party server 20 is operable to receive the transmitted file(s) and at step 406 the processor of the third party server is operable to execute a product characteristic identification process.

Referring now to FIG. 5, a simplified flow diagram is shown of the product characteristic identification process executed at step 406 of the process 324 illustrated in FIG. 4. The process 406 is illustratively stored in the memory 44 and/or data storage 46 of the third party server 20 in the form of instructions executable by the processor 40. The process 406 illustratively begins at step 500 where the processor 40 is operable to extract data from the one or more product label file(s). The extracted data for any one product is illustratively that which is displayed on the one or more product labels and/or packaging of that product. In any case, the process 406 advances from step 500 to step 502 where the processor 40 is illustratively operable to convert the extracted data to standardized data values, e.g., using conventional data standardization techniques. Thereafter at steps 504 and 506, the processor 40 is illustratively operable to analyze the standardized data values and assign a plurality of product characteristic identifiers to each of the one or more products based on the analysis. The one or more product characteristic identifiers for any particular product are determined by the processor 40 based on the information contained on the one or more labels and/or packaging attached to or associated with that product, and the processor 40 is illustratively operable to execute steps 504 and 506 by analyzing the standardized data to determine identifiers directly from and/or inferred from such information. In any case, following step 506, the process 406 illustrated in FIG. 5 returns to step 406 of the process 324 illustrated in FIG. 4.

In one embodiment, as described above with respect to the product content and claim data portion 210 of the database 202, the product characteristic identifiers may illustratively include at least one product content identifiers, at least one product claim and/or at least one derived product claims. The at least one product content identifier illustratively identifies for a product an amount, e.g., in the form of total amount, unit amount, percentage relative to a standard (e.g., in the context of food items, daily value (DV), recommended daily allowance (RDA), adequate intake (AI) or the like), etc., of an ingredient, element or nutritional component, and such identifier(s) is/are determined by the processor 40 directly from the information contained on the one or more labels and/or packaging attached to or associated with that product. In the context of the WIC example described above, examples of product ingredients may include, but are not limited to, sugar, corn syrup, or the like, examples of product elements may include, but are not limited to, chemical elements such as iron, calcium, etc., and examples of nutritional components may include, but are not limited to, fiber, cholesterol, protein, etc. The at least one identified product claim illustratively identifies for a product a claim made about the product, and such identifier(s) is/are determined by the processor 40 directly from the information contained on the one or more labels and/or packaging attached to or associated with that product. In the context of the WIC example described above, examples of identified product claims may include, but are not limited to, gluten free, whole grain, sugar free, lactose free or the like. The at least one derived product claim illustratively identifies for a product a claim about the product that is not identified on the product or it's label but which is derived by the processor 40 from one or more of the standardized data values and/or the existing product characteristic identifiers. In the context of the WIC example described above, a non-limiting example of derived product claim for a food item such as bacon may be "gluten free," which claim is illustratively derived from the inherent nature of the product in combination with an analysis of the information included on the product label(s) and/or the product packaging and/or based on one or more of the other product identifiers.

Referring again to FIG. 4, the process 324 advances from step 406 to step 408 where the processor 40 of the third party server 20 is operable to control the communication circuitry 48 thereof to transmit the product characteristic identifier data for the one or more products to the retail server 14, and at step 410 the processor 22 of the retail server 14 is operable to receive the transmitted data via the communication circuitry 30 thereof.

In some alternate embodiments, the product characteristic identification process 406 just described may be executed, in whole or in part, by the processor 22 of the retail server 14. In such embodiments in which the process 406 is executed in its entirety by the processor 22, the third party server 20 may be omitted from the system 10 illustrated in FIG. 1. In any case, following receipt of the product characteristic identifier data at step 410, the process 324 advances to step 412 where the processor 22 of the retail server 14 is operable to execute a product regulation (PR) analysis process.

Referring now to FIG. 6A, a simplified flow diagram is shown of the product regulation analysis process executed at step 412 of the process 324 illustrated in FIG. 4. The process 412 is illustratively stored in the product regulation (PR) analysis module 244 in the database 202 of the retail server 14 in the form of instructions executable by the processor 22. The process 412 illustratively begins at step 600 where the processor 22 is operable to store the received product characteristic identifier data in the database 202, e.g., in the product content and claim data portion 210 of the database 202. Thereafter at step 602, the processor 22 is operable to associate each set of product characteristic identifier(s) stored in the product content and claim data portion 210 of the database 202 at step 600 with a corresponding one of the products in the product data portion 206 of the database 202. Illustratively, the processor 22 is operable to execute step 602 by linking in a conventional manner each stored set of product characteristic identifier(s) with a corresponding product in either or both of the product content and claim data portion 210 of the database 202 and the product data portion 206 of the database 202 and/or in one or more other locations within the database 202. In any case, the process 412 advances from step 602 to step 604 where the processor 22 is operable to compare each of the product characteristic identifier(s) stored at step 600 and associated with a corresponding product at step 602 with applicable product regulation criteria in one or more jurisdictions stored in the product regulation criteria portion 212 of the database 202. In one embodiment, the processor 22 is operable to conduct such a comparison to determine whether the corresponding product(s) meet(s) the applicable product regulation criteria in one or more jurisdictions. Alternatively or additionally, the processor 22 may be operable to conduct such a comparison to determine whether product(s) that does/do not meet the applicable product regulation criteria in one or more jurisdiction should otherwise be regulation-eligible in one or more such jurisdictions. Alternatively or additionally still, the processor 22 may be operable to conduct such a comparison to determine whether non regulation-eligible products can be reformulated to become regulation eligible. Following execution of step 604, the process 412 returns to step 412 of the process 324 illustrated in FIG. 4.

Referring now to FIG. 6B, a simplified flow diagram is shown of the product comparison process executed at step 604 of the process 412 illustrated in FIG. 6A. The process 604 is illustratively stored in the product regulation (PR) analysis module 244 in the database 202 of the retail server 14 in the form of instructions executable by the processor 22. The process 604 illustratively begins at step 650 where the processor 22 is operable to, for a selected one of the products for which product characteristic identifier data was received at step 410, retrieve the associated product characteristic identifier(s) stored in the product content and claim data portion 210 of the database and determine therefrom a corresponding product category, i.e., a category of products in which the selected product is a member. As described above with respect to the product data portion 206 of the database 202, the product data illustratively includes information relating to one or more categories of products of which the product is a member. In the context of the WIC example described above, one non-limiting example of such a product category is "ready to eat cereal" of which a bran cereal product stored in the product data portion 206 of the database 202 is a member.

Following step 650, the processor 22 is illustratively operable at step 652 to retrieve at least one applicable product regulation (PR) rule set from the PR criteria stored in the product regulation criteria portion 212 of the database 202 based on the product category of the product selected at step 650. As described above with respect to the product regulation criteria portion 212 of the database 202, the product regulation criteria portion is illustratively organized by jurisdiction, and within each jurisdiction by product category, and in such embodiments the processor 22 is illustratively operable at step 652 to retrieve from the product regulation criteria portion 212 of the database 202 PR criteria in one more jurisdictions having product criteria matching that of the selected product. In the context of the WIC example described above, the product regulation criteria portion 212 of the database 202 illustratively includes State WIC rule sets for product categories matching those of the products stored in the product data portion 206 for each state in which the retail enterprise 12 has at least one brick-and-mortar store or in which the retail enterprise otherwise conducts retail sales of such products. In some alternate embodiments, the product regulation criteria portion 212 of the database 202 may further illustratively include corresponding Federal WIC rule sets. Using the WIC example and also the bran cereal example just described in which the product category of the example bran cereal product stored in the product data portion 206 of the database 202 is "ready to eat cereal," the corresponding product category in the State WIC rule sets may be "breakfast cereal." At step 652, the processor 22 is operable in this example to compare the product category "ready to eat cereal" to the product categories of one or more of the State WIC rule sets, and to retrieve from the product regulation criteria portion 212 the State WIC rule sets of one or more states in the product category "breakfast cereal." In some embodiments, the product/regulation mapping logic sets portion 216 of the database 202 may include mapping information for mapping product categories stored with the product data in the product data portion 206 of the database 202 to corresponding product categories for the various jurisdictions in the product regulation criteria rule sets. In other embodiments, the processor 22 may be operable at step 652 to correlate the product categories of the product data in the product data portion 206 of the database 202 to the corresponding product categories for the various jurisdictions in the product regulation criteria rule sets.

Upon execution of step 652, the processor 22 has the product characteristic identifiers for the selected product as well as the applicable product criteria rule set(s), and the processor 22 is thereafter operable at step 654 to map the product characteristic identifiers for the selected product to the applicable product criteria rule set(s), and at step 656 to compare one or more of the mapped product characteristic identifiers to corresponding ones of the applicable product criteria rules to determine whether the selected product satisfies the applicable product criteria rule set(s) in one or more jurisdictions. If so, the process 604 advances to step 658 and otherwise the process 604 advances to step 660.

As described above, the database 202 illustratively includes product/regulation mapping logic sets 214 for mapping product characteristic identifiers for products stored in the product data portion 206 of the database 202 to corresponding product regulation rules of one or more applicable product regulation rule sets stored in the product regulation criteria portion 212 of the database 202. In the context of the WIC example described above, the product/regulation mapping logic portion 214 of the database 202 illustratively includes a plurality of sets of logic maps for mapping product characteristic identifiers for one or more of the products stored in the product data portion 206 of the database 202 to one or more rules of a corresponding category of State WIC rule sets for each state in which the retail enterprise 12 has at least one brick-and-mortar store or in which the retail enterprise otherwise conducts retail sales of their products. In some embodiments, the product/regulation mapping logic portion 214 of the database 202 further illustratively includes a plurality of sets of logic maps for mapping product characteristic identifiers for one or more of the products stored in the product data portion 206 of the database 202 to one or more rules of a corresponding category of a Federal WIC rule set.

In some embodiments, such comparison and determination made at steps 654 and 656 may include a computational aspect in which one or more of the product characteristic identifiers is/are operated on to compute value(s) for comparison with one or more corresponding required values defined by one or more of the applicable product criteria rules to determine whether the computed value(s) satisfy the one or more corresponding required values. Alternatively or additionally, the comparison and determination made at steps 654 and 656 may include an associative aspect in which one or more of the product characteristic identifiers that may relate to a particular requirement defined by one or more of the applicable product criteria rules is/are compared with that requirement to determine whether such one or more product characteristic identifiers satisfy the particular requirement.

As a simplified example of the comparison and determination processes of steps 654 and 656 in the context of the WIC example described above, the Federal WIC rule set for the product category "breakfast cereals" may include the following three rules: (1) whole grain first ingredient, (2) not organic, and (3) at least 18 mg of iron per 100 g. In the bran cereal example described above, the product characteristic identifiers include a "whole grain" product claim identifier and a product content identifier indicating that the bran cereal contains 50% per serving of % DV (daily value) based on a serving size of 58 mg, and none of the product characteristic identifiers indicates that the product is organic. In this example, the product/regulation mapping logic sets 214 illustratively includes a Federal WIC logic map which maps the three product characteristic identifiers to the three Federal WIC criteria for "breakfast cereal." Illustratively, the Federal WIC logic map includes two associational mapping components and one computational mapping component, and at the mapping step 654 executed by the processor 22 a first associational mapping component maps the "whole grain" product claim identifier to the "whole grain first ingredient" requirement of the Federal WIC rules, and a second associational mapping component maps the absence of an "organic" claim, either explicit or derived, to the "not organic" requirement of the Federal WIC rules. Finally, the computational mapping component converts the iron content of the bran cereal, based on the product content identifier information, to units defined by the corresponding Federal WIC rule; i.e., [(50%*18 mg)/58 g]*100 g=15.5 mg of iron per 100 g of product. At the comparison step 656, the processor 22 determines that the "whole grain first ingredient" Federal WIC rule is satisfied based on the whole grain claim, and further determines that the "not organic" Federal WIC rule is also satisfied based on the lack of any organic claim in the product characteristic identifiers. However, the processor 22 determines that the 15.5 g of iron per 100 g of the bran cereal does not satisfy the Federal WIC rule "at least 18 mg of iron per 100 g." Consequently, since the bran cereal in this example fails the Federal WIC rule set, so too does the bran cereal fail each of the State WIC rule sets since none of the State WIC rule sets can be broader than the Federal WIC rule set.

Referring again to FIG. 6B, the processor 22 is illustratively operable at step 658, in cases where the product has satisfied the applicable product regulation rule set(s), to store an identifier of the product, e.g., UPC or other product identifier, and, in some embodiments, the results of the analysis conducted at any of steps 650-656, in one or more suitably marked regulation eligible files in the regulation-eligible product data 216. Since, at step 658, the product is presumed to be regulation-eligible, but has not yet been deemed so by one or more product regulation authorities, the regulation-eligible file(s) in which the product identifier is stored is suitably marked, e.g., +REG in the process 604 illustrated in FIG. 6B, to maintain such product identifiers separate from those which have previously been deemed regulation eligible. In the context of the WIC example described above, a suitably marked regulation eligible file, or portion thereof, is illustratively provided for the federal and each state in which the product is offered for sale by the retail enterprise 12. After storing the product identifier, and in some embodiments the associated analysis results, in the one or more suitably marked regulation eligible files 216 of the database 202, the process 604 advances to step 668 to determine whether another product is to be processed by the process 604.

If, at step 656, the processor 22 determines that the selected product has not satisfied the product regulation rule set in one or more jurisdictions, the process 604 advances to steps 660 and 662 where the processor 22 is illustratively operable to analyze the product content data, e.g., the mapped product information from step 654, in view of product content data for a similar product previously determined by one or more product regulation authorities to be regulation eligible, to determine whether the product "should" be regulation eligible based on a comparison thereof and notwithstanding the one or more violated rules. Whether the product "should" be regulation eligible may be based on one or many factors. In some embodiments, such a determination may be made entirely from information determined in the mapping process of step 654. Alternatively or additionally, such a determination may require one or more computations not made at step 654. In one embodiment, the processor 22 is illustratively operable at steps 660 and 662 to analyze the product content data for the product to determine an overall content of the product, to analyze the product content data for a similar product to determine an overall content of the similar product, and to determine that the product should be regulation eligible if its overall product content is superior to that of the similar product that has previously been deemed by one or more product regulation authorities to be regulation eligible.

As one non-limiting example in the context of the WIC example described above, the processor 22 may determine at step 660 that a particular food product "should" be regulation-eligible, even though the processor 22 has determined that the product has not satisfied all of the applicable product regulation rules, if it has an overall nutritional content that is greater than, or perhaps at least equal to, the nutritional content of one or more similar or comparable products, i.e., in the same product category, previously deemed by the Federal and/or one or more State WICs to be regulation-eligible under the same product regulation rules. Referring again to the bran cereal example described above, the processor 22 may be operable at step 660 to compute the nutritional content of the cereal, e.g., based on the collection of product characteristic identifiers received at step 410, to compute the nutritional content of one or more similar breakfast cereals previously deemed by a product regulation authority in a jurisdiction of interest to be regulation-eligible, and to compare the computed nutritional contents of the two products. If the processor 22 determines that the nutritional content of the bran cereal is greater than, or perhaps at least equal to, that of the previously deemed regulation-eligible breakfast cereal, the processor 22 is illustratively operable to conclude that the bran cereal "should" be regulation-eligible despite having deficient iron content.

If, at step 662, the processor 22 determines that the selected product "should" be regulation eligible, despite having failed or violated one or more product regulation criteria, the process 604 advances to step 664 where the processor 22 is operable to store an identifier of the product, e.g., UPC or other product identifier, and, in some embodiments, the results of the analysis conducted at steps 660 and 662, in one or more suitably marked regulation eligible files in the regulation-eligible product data 216. Since, at steps 654 and 656, the product has been determined by the processor 22 to not be regulation-eligible in one more jurisdictions, but at steps 660 and 662 it has been determined by the processor 22 that the product "should" notwithstanding the determination regulation-ineligibility at steps 654 and 656, be regulation eligible, the regulation-eligible file(s) in which the product identifier is stored in suitably marked regulation eligible files, e.g., *REG in the process 604 illustrated in FIG. 6B, to maintain such product identifiers separate from those which have previously been deemed regulation eligible and from those which have previously been determined by the processor 22 to regulation-eligible and are awaiting confirmation of the same by one or more product regulation authorities. In the context of the WIC example described above, a suitably marked regulation eligible file, or portion thereof, is illustratively provided for the federal and each state in which the product is offered for sale by the retail enterprise 12. After storing the product identifier, and in some embodiments the associated analysis results, in the one or more suitably marked regulation eligible files 216 of the database 202, the process 604 advances to step 664 to determine whether another product is to be processed by the process 604.

If, at step 662, the processor 22 determines that the product subject to the analysis of step 660 should not be regulation eligible, the process 604 advances to step 666 where the processor 22 is illustratively operable to execute a product reformation analysis process to determine whether the product can be reformulated so as to become regulation eligible in one or more jurisdictions.

Referring now to FIG. 6C, a simplified flow diagram is shown of the product reformation analysis process executed at step 666 of the process 604 illustrated in FIG. 6B. The process 666 is illustratively stored in the product reformation analysis module 246 of the product regulation module 240 in the form of instructions executable by the processor 22 of the retail server 14. The process 666 illustrated in FIG. 6C begins at step 670 where the processor 22 is operable to determine deviations between the selected product, i.e., the content of the selected product, and one or more of the applicable product regulation rules in one or more jurisdictions. Thereafter at step 672, the processor 22 is operable to assess any such deviations determined at step 670 to determine the feasibility of modifying one or more features, i.e., ingredients, of the product so as to make the product regulation-eligible. Using the bran cereal example described above, for example, the processor 22 may determine at step 672 whether it is feasible to reformulate the bran cereal to include additional iron in an amount which will raise the total amount of iron to 18 milligrams or more per 100 grams of the bran cereal so as to be compliant with the Federal WIC requirement of at least 18 milligrams per 100 grams of the product. Thereafter at step 674, the processor 22 is operable to determine, based on the outcome of step 672, whether such product reformulation is feasible. If so, the process 666 advances to step 676 where the product undergoes a reformulation process consistently with the determinations made at step 672, to make the product regulation-eligible. Typically, the process step 676 is executed manually, or at least partially manually. In any case, following step 676, the processor 22 is operable at step 678 to transmit the product label file(s) of the reformulated product to the third party server so that product characteristic identifiers can be determined and the product regulation analysis process of step 412 can be carried out on the product characteristic identifiers of the reformulated product. Following step 678, and also from the "NO" branch of step 674, the process 666 returns to step 666 of the process 604 illustrated in FIG. 6B.

Referring again to FIG. 6B, the process 604 also advances from the "NO" branch of step 662 to step 668 where the processor 22 is operable to determine whether the data received at step 410 includes product characteristic identifier data for another product. If so, the process loops back to step 650, and otherwise the process 604 returns to step 414 of the process 324 illustrated in FIG. 4.

Referring again to FIG. 4, the process 324 advances from step 412 to step 414 where the processor 22 of the retail server 14 is operable to compile the report(s) generated at step 414, illustratively including one or more product and/or product label images and corresponding product regulation analysis results for the product(s) included in the data received at step 414. Thereafter at step 416, the processor 22 is operable to control the communication circuitry 30 to transmit the compiled information, including the product report(s), to one or more of the product regulation servers $18_1$-$18_N$, i.e., to the product regulation server(s) in the jurisdiction(s) of interest. Thereafter at step 418, the one or more product regulation servers $18_1$-$18_N$ receive the transmitted report(s), and at step 420 the one or more corresponding product regulation authorities or agencies conduct a conventional off-line product review process to deem the products contained in the report regulation eligible or regulation ineligible. As the product(s) contained in the report(s) have been rigorously analyzed by the retail server 14 against the applicable product regulations, it is expected that products determined by the retail server 14 to be regulation-eligible will likewise be deemed to be regulation eligible by the corresponding product regulation authorities or agencies. In some embodiments, the process 420 is a manual process, although in other embodiments the process 420 may be executed in whole or in part by the one or more product regulation servers $18_1$-$18_N$. In any case, the process 324 advances from step 420 to step 422 where the one or more product regulation servers $18_1$-$18_N$ is/are operable to transmit a list of products from the received report(s) that have been deemed by the applicable product regulation authorities or agencies to be regulation eligible. In some embodiments, such a list is illustratively in the form of product identifiers, e.g., UPCs or other identifiers, of the regulation eligible products. In any case, the list of regulation eligible products is received by the retail server 14 at step 424.

At step 426, the processor 22 is operable to store the regulation eligible product list in the regulation eligible product data 216 and to mark corresponding products in the product data portion 206 of the database 202 as regulation eligible. Following step 428, the process 324 advances to step 428 where the processor 22 of the retail server 22 is operable to execute a similar product identification process.

Referring now to FIG. 7, a simplified flow diagram is shown of an embodiment of the similar product identification process executed at step 320 of the process 300 illustrated in FIG. 3 and at step 428 of the process 324 illustrated in FIG. 4. The process 320, 428 is illustratively stored in the similar product ID module 248 in the form of instructions executable by the processor 22 of the retail server 14. In the illustrated embodiment, the process 320, 428 begins at step 700 where the processor 22 is operable to select a product, e.g., a product UPC or other product identifier, from the product data portion 206 of the database 202. Illustratively, the selected product is one that has been newly or recently marked as regulation eligible in one or more jurisdictions. In any case, the process 320, 428 advances from step 700 to step 702 where the processor 22 is operable to analyze the corresponding product content data, i.e., the product characteristic identifiers stored in the product content and claim data 210, to determine the one or more product features, e.g., product ingredients and/or claims, relevant to regulation eligibility in one or more jurisdictions. Thereafter at step 704, the processor 22 is operable to search the product data portion 206 of the database 202 for similar products which satisfy or exceed the one or more product features determined at step 702 but which are not marked as regulation eligible. Using the bran cereal example described above, the processor 22 is illustratively operable at step 702 to determine as relevant to regulation eligibility (1) whole grain first ingredient, (2) not organic, and (3) at least 18 mg of iron per 100 g, and thereafter at step 704 the processor 22 is operable to search the product data portion 206 of the database 202 to locate other breakfast cereals not currently marked as regulation eligible but which satisfy (or exceed) the three foregoing criteria.

The process 320, 428 advances from step 704 to step 706 where the processor 22 is operable to store product identifiers of any such similar products found at step 704, as well as one or more associated analysis reports, in suitably marked regulation eligible files, e.g., *REG in the process 320, 428 illustrated in FIG. 7, to maintain such product identifiers separate from those which have previously been deemed regulation eligible and from those which have previously been determined by the processor 22 to regulation-eligible and are awaiting confirmation of the same by one or more product regulation authorities. Thereafter at step 708, the processor 22 is operable to determine whether another product, e.g., one that has been newly or recently marked as regulation eligible in one or more jurisdictions, is available. If so, the process 320, 428 loops back to step 700, and otherwise the process 320, 428 returns to the process 300 or 324 respectively.

Referring again to FIG. 4, the process 324 advances from step 428 to step 430 where the processor 22 is operable to determine whether any similar products were identified in the execution of the process 428. If so, the process 324 loops back to step 414 to compile the analysis report(s) of such similar products for determination of regulation eligibility thereof by one or more product regulation authorities or agencies. From the "NO" branch of step 430, the process 324 is complete.

The process 324 also illustratively advances from step 426 to step 432 to execute a regulation eligible product integration process, after which the process 324 is complete. Referring now to FIG. 8, a simplified flow diagram is shown of an embodiment of the regulation eligible product integration process executed at step 432 of the process 324 illustrated in FIG. 4. Illustratively, the process 432 is stored in the regulation eligible product integration module 250 in the form of instructions executable by the processor 22 of the retail server 14. In the illustrated embodiment, the process 432 includes a number of different regulation eligible product integration processes each operating independently of the other but all of which may implement regulation eligible product information. For example, at step 400 the processor 22 is operable to notify or enable the shelf strip or tag print module 232 to print a regulation eligible identifier in the product label field of shelf strips or tags for each product marked in the product data portion 206 of the database 202 as regulation eligible. In the WIC example described above, for example, such a regulation eligible identifier may be "WIC," "WIC Authorized, "WIC Approved" or other such indicator.

As an example of another regulation eligible product integration process, the processor 22 is illustratively operable at step 802 to configure the website module 230 to allow customers to select one or more product regulation preferences which will be subsequently carried out automatically by the processor 22. As one example, the processor 22 may be operable at step 802 to configure the website module 230 to allow customers to select a preference which causes the processor 22 to thereafter flag for such customers regulation eligible products and display such regulation eligible products to such customers via customer computing devices and/or mobile communication devices. In some embodiments, the processor 22 may be operable to display such regulation eligible products to customers for the purpose of advertising and/or for purchase by pre-approved customers via a product purchase website controlled and managed by or for the web server 14.

As another example, the processor 22 may be operable at step 802 to configure the website module 230 to allow pre-approved customers to select a preference which causes the processor 22 to thereafter make available to such customers, e.g., via the selecting customers' virtual coupon repositories, virtual coupons for regulation eligible products. In some embodiments, the processor 22 may be operable to determine whether a customer is eligible, i.e., pre-approved, for the purchase of regulation eligible products before allowing the customer to select a preference which causes the processor 22 to flag and display regulation eligible products to the customer via a customer computing device or a mobile communication device and/or before allowing the customer to select a preference which causes the processor 22 to thereafter make available to the customer, via the customer's virtual coupon repository 222, virtual coupons for regulation eligible products. In some embodiments, for example, the customer may be required to enter an eligibility code which identifies the customer as eligible for the purchase of regulation eligible products. The eligibility code may be, for example, one which the processor 22 is operable to compare with a list of stored codes, e.g., stored in the memory 26 or stored in one of the product regulation servers 18 and transmitted to the retail server 14, which represent eligibility to purchase regulation eligible products. If the processor 22 finds a match between the received code and one on the list of stored codes, the processor 22 determines that the customer entered code is valid and that the customer entering the eligibility code is therefore eligible to purchase regulation eligible products. As another example, the eligibility code may identify a voucher or electronic benefits transfer (EBT) card issued to the customer by a product regulation authority for the purchase of regulation eligible products, and in this example the processor 22 is operable to determine that the received eligibility code is valid and that the customer entering the received code is therefore eligible to purchase regulation eligible products if the processor 22 finds a match between the received eligibility code and one on a stored list of valid eligibility codes and/or if the voucher or EBT card provides for the transfer of funds via which the customer entering the code can purchase regulation eligible products from the retail enterprise. As yet another example in which the customer is an EMS member, the processor 22 may determine such customer eligibility automatically by determining whether the customer's EMS account includes a regulation eligible product purchase identifier. If the customer's EMS account includes such a regulation eligible product purchase identifier, the processor 22 is operable to determine that the corresponding customer is eligible to purchase regulation eligible products.

As an example of yet another regulation eligible product integration process, the processor 22 is illustratively operable at step 804 to store regulation eligible product identifiers, e.g. UPCs or other identifiers, in the memories of one or more of the point-of-sale systems 34, or make such regulation eligible product identifiers available to the point-of-sale systems 34 in real time, for automatic detection by the point-of-sale systems 34 of regulation eligible products during customer purchase transactions. In such embodiments, the point-of-sale system 34 at which a customer has presented products for purchase is illustratively operable to determine the identity of one or more of the products to be purchased by the customer in a conventional manner, e.g., by scanning a UPC or other code affixed to the product, to then automatically compare the identity of the product to the stored or otherwise received regulation eligible product identifiers, and to determine that the identified product is regulation eligible if the identity of the product matches one of the regulation eligible product identifiers.

In some embodiments, the point-of-sale system 34 is then operable to determine whether the customer is eligible for restricted purchase of any of the products determined by the point-of-sale system 34 to be regulation eligible. In some embodiments, for example, the customer may be required to present a regulation eligible product purchase identifier in the form of a code that may be scanned or otherwise entered into the point-of-sale system 34. In other embodiments in which the customer is an EMS member, the point-of-sale system 34 may determine such customer eligibility automatically by determining whether the customer's EMS account includes a regulation eligible product purchase identifier. In either case, the point-of-sale system 34 is illustratively operable to allow purchase by the customer of the product(s) identified as regulation eligible if the point-of-sale system 34 determines that the customer is eligible to purchase such regulation eligible products.

In some embodiments, the restricted purchase program may include subsidies for the purchase of regulation eligible products. In some such embodiments, customers may present regulation eligible product purchase identifiers in the form of vouchers or electronic benefits transfer (EBT) cards, or in the form of some other scannable code that is tied to a subsidy source. In such embodiments, the point-of-sale system 34 may be operable to process appropriate subsidy amounts based on the voucher, e.g., either automatically or with the assistance of a cashier, or to automatically deduct appropriate subsidy amounts from an EBT card presented by the customer. In other embodiments, subsidy amounts may be stored in the form of a digital wallet in a customer's EMS account, and in such embodiments the point-of-sale system 34 may be operable, after identifying the customer as an EMS member and as eligible for the purchase of regulation eligible products, to automatically deduct appropriate subsidy amounts from the customer's digital wallet for the purchase of the regulation eligible products.

Those skilled in the art will recognize other processes for integrating regulation eligible product information into one or more processes controlled and managed by or for the retail server 14, and it will be understood that such other processes are intended to fall within the scope of this disclosure.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. For example, it will be understood that while several process steps in various sequences have been illustrated and described herein with respect to the processes set forth in FIGS. 3-8, any one or more such processes may alternatively include more, fewer and/or different steps, and that any such steps may be executed in different sequences from those illustrated and described, without departing from the scope of the concepts and techniques described herein.

What is claimed is:

1. A method for processing and implementing product regulations at a retail enterprise, the method comprising:
   receiving, via communication circuitry of a retail server of
      the retail enterprise from a product regulation server of a product regulation authority, a first signal carrying a list of products offered for sale by the retail enterprise that are regulation-eligible, wherein a regulation-eligible product is defined as a product authorized by the product regulation authority to be eligible for restricted sale to a subset of customers of the retail enterprise under a product regulation program, comparing, by a processor of the retail server, the received list of products with product data stored in a database coupled to the processor, the product data identifying products offered for sale to all customers of the retail enterprise, with the processor, marking in the database as regulation eligible each product in the product data that matches a product in the received list of products and that is not already marked as regulation-eligible in the database, for at least one product marked in the database as regulation-eligible, (a) determining with the processor one or more characteristics of the product upon which determination by the product regulation authority of the regulation-eligibility of the at least one product is based, (b) searching, with the processor, the database to identify similar products stored therein which have the one or more characteristics but which are not marked in the database as regulation eligible, (c) for each identified similar product, generating with the processor a report including the identified similar product and the one or more characteristics thereof, and (d) controlling the communication circuitry with the processor to transmit to the product regulation server a second signal carrying a list of the identified similar products and associated reports and also carrying a request for a determination of regulation-eligibility of the identified similar products based on their associated reports, notifying, with the processor, a shelf strip or tad print module stored in the retail server to print a regulation-eligible indicator in a product information field of a shelf strip or tad for each product in the received list of products, and printing, with a shelf strip or tag printer under control of the shelf strip or tad module of the retail server, shelf strips or tags including the regulation-eligible indicator in the product information field of each product in the received list of products.

2. A method for processing and implementing product regulations at a retail enterprise, the method comprising:

receiving, via communication circuitry of a retail server of the retail enterprise from a product regulation server of a product regulation authority, a first signal carrying a list of products offered for sale by the retail enterprise that are regulation-eligible, wherein a regulation-eligible product is defined as a product authorized by the product regulation authority to be eligible for restricted sale to a subset of customers of the retail enterprise under a product regulation program, comparing, by a processor of the retail server, the received list of products with product data stored in a database coupled to the processor, the product data identifying products offered for sale to all customers of the retail enterprise, with the processor, marking in the database as regulation eligible each product in the product data that matches a product in the received list of products and that is not already marked as regulation-eligible in the database, for at least one product marked in the database as regulation-eligible, (a) determining with the processor one or more characteristics of the product upon which determination by the product regulation authority of the regulation-eligibility of the at least one product is based, (b) searching, with the processor, the database to identify similar products stored therein which have the one or more characteristics but which are not marked in the database as regulation eligible, (c) for each identified similar product, generating with the processor a report including the identified similar product and the one or more characteristics thereof, and (d) controlling the communication circuitry with the processor to transmit to the product regulation server a second signal carrying a list of the identified similar products and associated reports and also carrying a request for a determination of regulation-eligibility of the identified similar products based on their associated reports, establishing and controlling, with the processor, a retail website via which customers of the retail enterprise can view products offered for sale by the retail enterprise, configuring, with the processor, the retail website to allow customers accessing the website to select viewing of regulation-eligible retail products, and controlling, with the processor, the website to display regulation-eligible retail products for viewing by customers selecting to view regulation-eligible products.

3. The method of claim 2, wherein the retail website includes a retail product purchase feature, and wherein the method further comprises configuring, with the processor, the retail website to allow purchase via the retail product purchase feature of regulation-eligible retail products by customers approved for purchase of regulation-eligible retail products.

4. The method of claim 3, further comprising:

determining, with the processor, whether a customer accessing the website and selecting to purchase regulation-eligible retail products via the retail product feature is eligible to purchase regulation-eligible retail products, and processing, with the processor, purchase by the customer of regulation-eligible products only after determination by the processor that the customer is eligible to purchase regulation-eligible retail products.

5. The method of claim 4, wherein determining whether the customer is eligible to purchase regulation-eligible retail products comprises:

receiving, by the processor from the customer, an eligibility code, determining, by the processor, whether the received eligibility code is valid, and determining that the customer is eligible to purchase regulation-eligible retail products if the processor determines that the received eligibility code is valid.

6. The method of claim 1, further comprising:

determining whether a customer purchasing a regulation-eligible product is eligible to purchase the regulation eligible retail product, and processing, with the processor, purchase by the customer of the regulation-eligible product only after determining that the customer is eligible to purchase the regulation-eligible retail product.

* * * * *